(12) United States Patent
Fischer

(10) Patent No.: US 11,524,662 B2
(45) Date of Patent: Dec. 13, 2022

(54) TRAILER LEVELING ASSEMBLIES AND METHOD

(71) Applicant: Steve Fischer, Hartland, WI (US)

(72) Inventor: Steve Fischer, Hartland, WI (US)

(73) Assignee: Steve Fischer, Hartland, WI (US)

( * ) Notice: Subject to any disclaimer, the term of this patent is extended or adjusted under 35 U.S.C. 154(b) by 447 days.

(21) Appl. No.: 16/654,537

(22) Filed: Oct. 16, 2019

(65) Prior Publication Data

US 2021/0114564 A1    Apr. 22, 2021

(51) Int. Cl.
*B60S 9/04*    (2006.01)

(52) U.S. Cl.
CPC ........... *B60S 9/04* (2013.01); *B60Y 2200/147* (2013.01)

(58) Field of Classification Search
CPC ..... B60S 9/00; B60S 9/02; B60S 9/04; B60Y 2200/147
See application file for complete search history.

(56) References Cited

U.S. PATENT DOCUMENTS

| | | | | |
|---|---|---|---|---|
| 1,166,398 A * | 12/1915 | Zega | ........................ | B60S 9/04 254/422 |
| 1,297,334 A * | 3/1919 | Elizondo | .................. | B60S 9/04 254/134 |
| 1,359,044 A * | 11/1920 | Farrington | ................ | B60S 9/04 254/427 |
| 2,012,554 A * | 8/1935 | Travis | ........................ | B60S 9/04 254/94 |
| 3,181,891 A * | 5/1965 | Moats | ........................ | B60S 9/04 280/765.1 |
| 3,614,064 A * | 10/1971 | Bennett | ...................... | B60S 9/04 254/418 |
| 6,425,604 B1 * | 7/2002 | Schubert | .................... | B60S 9/08 280/764.1 |
| 6,526,850 B1 * | 3/2003 | Miller | ........................ | B60S 9/04 81/177.2 |
| 2015/0041741 A1 * | 2/2015 | Hyslop | ...................... | B60S 9/04 254/422 |

* cited by examiner

*Primary Examiner* — Frank B Vanaman
(74) *Attorney, Agent, or Firm* — Boyle Fredrickson S.C.

(57) ABSTRACT

Systems and methods for manipulating the pitch and/or tilt of a trailer relative to a supporting surface. A trailer leveling system includes one or more telescopically adjustable support assemblies that are constructed to be pivotably connected to a frame of a trailer. Each support assembly includes a post that is pivotably connected to a trailer frame. A rack is formed along at least one side of the post. A tube slideably cooperates with the post and supports a pawl that cooperates with the rack to allow translation of the tube relative to the post in a first direction and selectively prevent translation of the tube relative to the post in the opposing direction.

16 Claims, 18 Drawing Sheets

TRAILER LEVELING ASSEMBLIES AND METHOD

BACKGROUND OF THE INVENTION

1. Field

The application relates to trailer assemblies and more particularly, to a system and method associated with manipulating the pitch and/or tilt of a respective trailer when the trailer is stationary or otherwise not under transit.

2. Description of the Prior Art

Trailers are provided in litany of configurations and are commonly named according to an intended application associated with use of the discrete trailer. Travel, jobsite or work trailers and/or camper trailers commonly define an enclosed living or working space and can be conveniently transported over the road between destinations via selective cooperation with a respective tow vehicle. Utility, transport, dump, deck over, and cargo trailers are but a few exemplary trailer configurations that are provided in both open and enclosed, or partially enclosed, configurations and are similarly conveniently transportable via a respective tow vehicle. It is understood that the above listing of types or configurations of trailers is merely exemplary and is not exhaustive of the various forms, configurations, or types of trailers whose use or function are intended to benefit from the systems and methods disclosed in the present application.

Whether used for transporting goods, materials, equipment, and/or providing a transportable living or working environment, the topography or terrain of each discrete destination can be ill-suited for trailer placement and/or ill-suited to accommodate the desired or intended use or interaction with the underlying trailer. With respect to trailers that are configured to define living or working spaces, placement of such trailers upon uneven ground can adversely affect user comfort and/or complicate user interaction with the trailer, its fixtures or amenities, and/or the environment. Such complications can include adverse effects upon the desired operation of plumbing features and/or fixtures, operation of doors, cabinets, drawers, heating and cooling equipment, use of counter or desk surfaces, etc. Uneven setting of the trailer, in either or both of a longitudinal or travel direction or a lateral or side-to-side direction can also adversely affect user work, dining, and sleep experiences.

Although gravitationally perfectly level presentation of such trailers would be preferable in most cases, it is appreciated that a variable degree of deviation from a perfectly level presentation of the trailer will be tolerable for both suitable operation of the systems and/or fixtures defined by the trailer as well as the user comfort associated with interaction therewith. It is further appreciated that the relative tolerable degree of deviation in the fore and aft direction, or pitch of the trailer, may be dissimilar from the relative tolerable degree of deviation in the lateral side-to-side, or lean or tilt or tip directions of the underlying trailer.

Although less often employed or desired in utility trailer configurations, persons familiar with the use of such trailers will readily appreciate some of the shortcomings associated with unlevel or uneven interaction with such trailers. Trailers inclined or pitched in fore or aft directions, directions commonly aligned with the axis of travel of such trailers during transit, can be difficult to load and/or unload from side orientations and/or are difficult, if even possible, to associate forked equipped with goods and materials associate with the trailer. Similarly, inclined or pitched orientations of the trailer can render loading and/or unloading of wheeled or independently powered equipment problematic if not also more difficult and/or dangerous depending on the relative degree of incline and/or tilt of the trailer relative to a level configuration. Most users appreciate the desired or intended presentation of the trailer relative to the surrounding terrain to achieve the desired interaction with the trailer and/or goods, materials, and/or equipment associated therewith.

Although some users prefer to, or have the capability to, move a trailer situated upon uneven terrain to terrain that presents the trailer at a more preferred inclination or orientation, there are many instances wherein translation of the trailer from an available location is unavailable or unfeasible. Such alternative approaches are commonly unavailable when the trailer is provided as a camper trailer in that third parties generally control the topography and space available for placement of the trailer and a consideration to use of such locations is commonly heavy forestation in proximity to a plurality of discrete parking or camping sites.

Cognizant of the various challenges disclosed above, as well as other challenges attenuate to interaction with or use of uneven trailers, others provide various assemblies and methodologies associated with manipulating the orientation of a trailer relative to a ground or support surface. One such approach relies upon the presentation of one or more crank jack structures being deployed between the trailer frame and the ground surface. Some such assemblies are supported by the underlying trailer structure whereas other approaches rely on location and placement of discrete jack devices each time the trailer is intended to be leveled relative to a discrete location. Still others rely on the transport and placement of one or more blocks or ramps intended to level the parking surface prior to and during placement of the trailer.

Many users can attest to the generally tedious and arduous nature associated suitable placement of the multiple jack assemblies and subsequent sequential operation thereof until the desired degree of levelness of a trailer has been achieved. Occasionally during such efforts, one or more of the discrete jack devices reaches an end of their discrete operating range. Such occurrences can aggravate even experienced operators as resolution of the same requires removal of the discrete jack mechanism, acquisition and placement of necessary blocking—if available; and replacement and subsequent operation of the discrete jacking device. Alternatively, movement of the trailer can be periodically required. Such occasions can be exacerbated by periods of inclement weather and/or leveling operations attempted to be executed upon muddy or rocky terrain as the user is commonly upon their hands and knees, awkwardly positioned, and subject to strenuous operation of equipment to achieve the desired placement and operation of the jack assemblies at locations under the body of the trailer.

In effort to mitigate the shortcomings disclosed above, others provide trailer leveling systems and methods that include one or more powered adjuster mechanisms that manipulate the inclination or pitch of an underlying trailer structure during operation thereof. Unfortunately, such approaches commonly include one or more hydraulic, pneumatic, or electronic actuators whose orientation and/or length can be adjusted to manipulate the inclination or pitch of the underlying trailer system. Although such approaches are less arduous or strenuous to implement and operate, such approaches are considerably more expensive to implement and maintain throughout the service life of the underlying trailer and can complicate deploying or retracting the leveling system during power shortages or outages and/or the unavailability or inaccessibility of utility or battery power at remote locations.

Accordingly, there is a need for a trailer leveling system and method that can be manually operated, is convenient and intuitive to implement and deploy, and provides adjustable operation of each of the discrete leveling systems associated with a discrete trailer to achieve a desired pitch and tilt of the trailer relative to the terrain upon which the trailer is supported.

SUMMARY OF THE INVENTION

This application discloses a trailer leveling system and method that resolves one or more of the drawbacks disclosed above. One aspect of the present application discloses a trailer leveling system includes one or more telescopically adjustable support assemblies that are constructed to be pivotably connected to a frame of a trailer. Each support assembly includes a post that is pivotably connected to a trailer frame. A rack is formed along at least one side of the post. A tube slideably cooperates with the post and supports a pawl that engages the rack and is configured to allow translation of the tube relative to the post in a first direction and selectively prevent translation of the tube relative to the post in the opposing direction.

Another aspect of the present application discloses a trailer leveling system having a post that is constructed to be pivotably connected to a trailer frame. A rack is formed along at least a portion of post and a tube slideably cooperates with the post. A pawl is pivotably connected to the tube and is oriented to cooperate with the rack to selectively prohibit longitudinal translation of the tube in an overlapping direction relative to the post when the pawl is engaged with the rack.

A further aspect of the present application discloses a trailer support system that includes a support assembly that is defined by a tube and a post that slideably cooperate with one another to manipulate a longitudinal length of the support assembly. A rack is formed by a respective one of the tube and the post and a pawl is supported by the other of the tube and the post. The rack is formed in a surface of the respective one of the tube and post that faces the other of the tube and the post. The pawl is pivotably connected to the other of the tube and the post and oriented to interact with the rack to selectively prevent reducing a length of the support assembly and allow the tube and the post to telescopically cooperate with one another when the length of the support assembly is increased.

Another aspect of the present invention discloses a method for forming a trailer leveling assembly. The method includes providing a support assembly that is defined by a first member and a second member that slideably cooperate with one another. A rack is defined by one of the first member and the second member and extends along at least a portion thereof. A pawl is pivotably supported by the other of the first member and the second member such that the pawl selectively engages the rack to prevent bypass translation of the first member and the second member in a direction that decreases a length of the support assembly and allows bypass translation of the first member and the second member in a direction that increases the length of the support assembly. A mount is provided and is constructed to be secured to a structural member of a trailer and pivotably support at least one support assembly. A plurality of catches are provided to maintain more than one rotational position of the support assembly relative to the saddle. These and other aspects, features, and advantages of the present invention will be made apparent from the following detailed description and the drawings.

BRIEF DESCRIPTION OF THE DRAWINGS

The drawings illustrate preferred embodiments presently contemplated for carrying out the invention and show various views of the trailer leveling systems or assemblies according to the present invention.

FIG. 4

DETAILED DESCRIPTION

Figure 1:
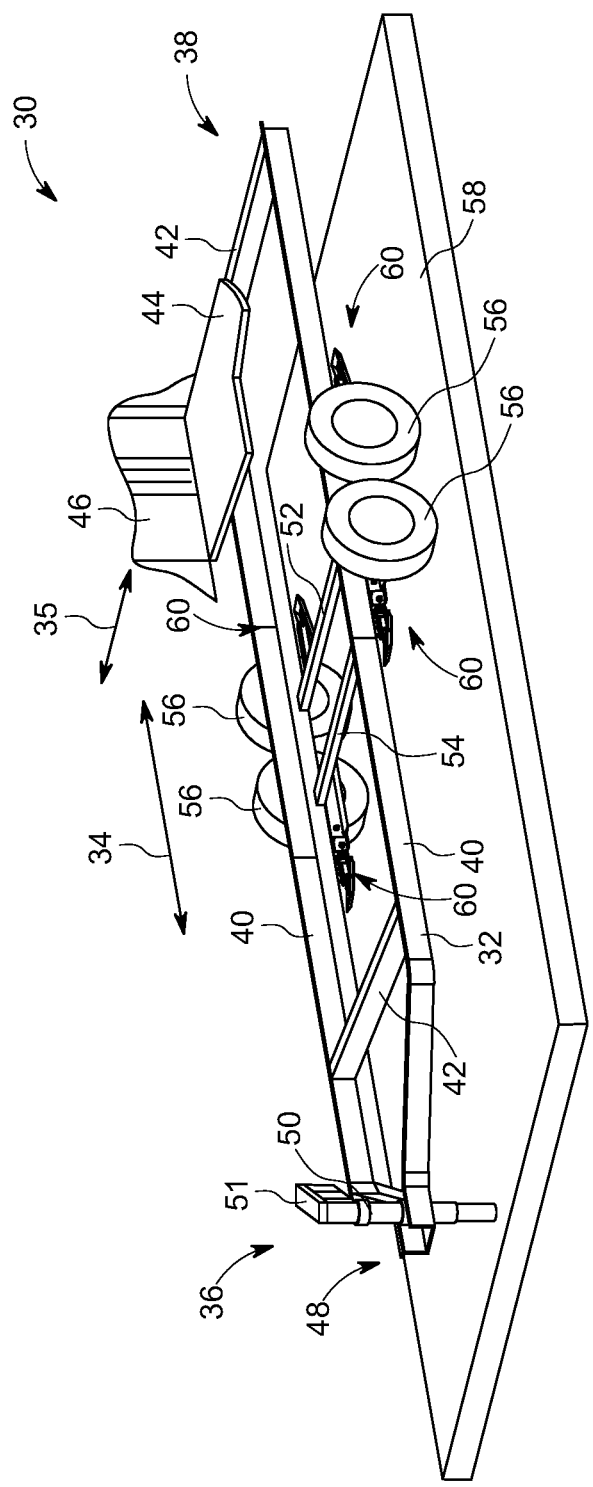
FIG. 1 is a graphical perspective view of an exemplary trailer equipped with a trailer leveling system or assembly according to the present invention.

With reference now to the drawings, FIG. 1 shows a trailer assembly or simply a trailer 30 equipped with several trailer leveling systems or assemblies 60 according to the present invention. Trailer 30 is generally defined by a frame 32 that extends in a longitudinal direction or length, indicated by arrow 34, from a forward facing end 36 to a rearward facing end 38. It is appreciated that although trailer 30 is shown as having an elongate configuration wherein the longitudinal length 34 is longer than a lateral dimension or width, indicated by arrow 35, leveling assembly 60 is configured and operable to accommodate leveling of trailers having various dimensions, configurations, and intended uses or application as disclosed above. As used herein, the longitudinal length or direction of trailer 30 is that dimension that is generally aligned with the direction of travel of trailer 30 when it is under way and the corresponding lateral, side-to-side direction or width is the direction of trailer 30 that is orthogonal or transverse to the direction of travel. As such, as used herein, the nomenclature of the longitudinal and lateral or length and width associated with trailer 30 is indifferent to any particular relative comparison of the length and width of different trailers relative to one another.

Frame 32 of trailer 30 generally includes one or more longitudinal frame members 40 and one or more laterally extending or cross frame members 42 that extend between longitudinal frame members 40. A deck 44 generally defines the upper or load surface of trailer 30. Deck 44 can be formed of any number of materials including lumber, metal, and expanded metal materials, etc., commonly selected to be attenuate to the intended use of purpose associated with the use of trailer 30. When enclosed space is desired or required, trailer 30 can include one or more sidewall 46 and/or a roof, or the like associated with defining an enclosed space associated with trailer 30.

Forward facing end 36 of trailer 30 generally defines a tongue 48 and includes a jack stand or simply a jack 50 associated therewith. Is it appreciated that jack 50 can be provided to include a power head 51 in any of a manually, electrically, and/or hydraulically operated to manipulate the front to rear inclination, declination or front to rear pitch or tilt of trailer 30 during operation of jack 50. Regardless of the operational modality, those skilled in the art will appreciate that jack 50 is configured to facilitate raising and lowering of tongue 48 of trailer 30 so as to accommodate association of and/or removal of trailer 30 from a respective tow vehicle when desired.

Trailer 30 includes one or more axles 52 that are secured to frame 32 and have respective wheels 56 generally associated with the opposite ends thereof. Alternatively, it is further envisioned that depending upon the intended load rating of trailer 30, that each wheel 56 could be secured to a respective frame member 40 via a stub axle or the like rather than a through axle as shown in FIG. 1. Although shown is what is commonly referred to as a dual axle trailer, it is further appreciated that trailer 30 could be provided in virtually any configuration customary to the intended application, load rating, or use thereof. Depending upon the construction of trailer 30, it is appreciated that one or more of axles 52, frame 32, and deck 44 define a support structure, rigid structures, or structural member of trailer 30 as the same may be constructed to support trailer 30 if a lifting device is disposed between the ground or support surface and the respective support structure to manipulate the fore/aft or side-to-side or lateral levelness of trailer 30.

Tires 56 support trailer 30 upon a supporting or ground surface 58 during transport of trailer 30 and occasionally support trailer 30 during stationary use thereof. It is appreciated that the quality of condition of ground surface 58 may periodically require the placement of blocking or the like to accommodate the desired interaction or support of trailer 30 thereupon. As used herein, reference to ground surface 58 includes use of such blocking. As discussed above, when trailer 30 is rendered stationary relative to ground surface 58, it may periodically be desired or necessary to manipulate the inclination or tilt of trailer 30 relative to ground surface 58 in both the longitudinal or fore/aft direction, indicated by arrow 34, as well as the lateral or side-to-side direction, indicated by arrow 35. Trailer leveling system or assembly 60, and preferably a plurality of independently operable trailer leveling systems or assemblies 60, are associated with trailer 30 and secured to respective structural members thereof and operable to manipulate the pitch and/or tilt, i.e. the levelness, of trailer 30 relative to ground surface 58 when desired.

Figure 2:
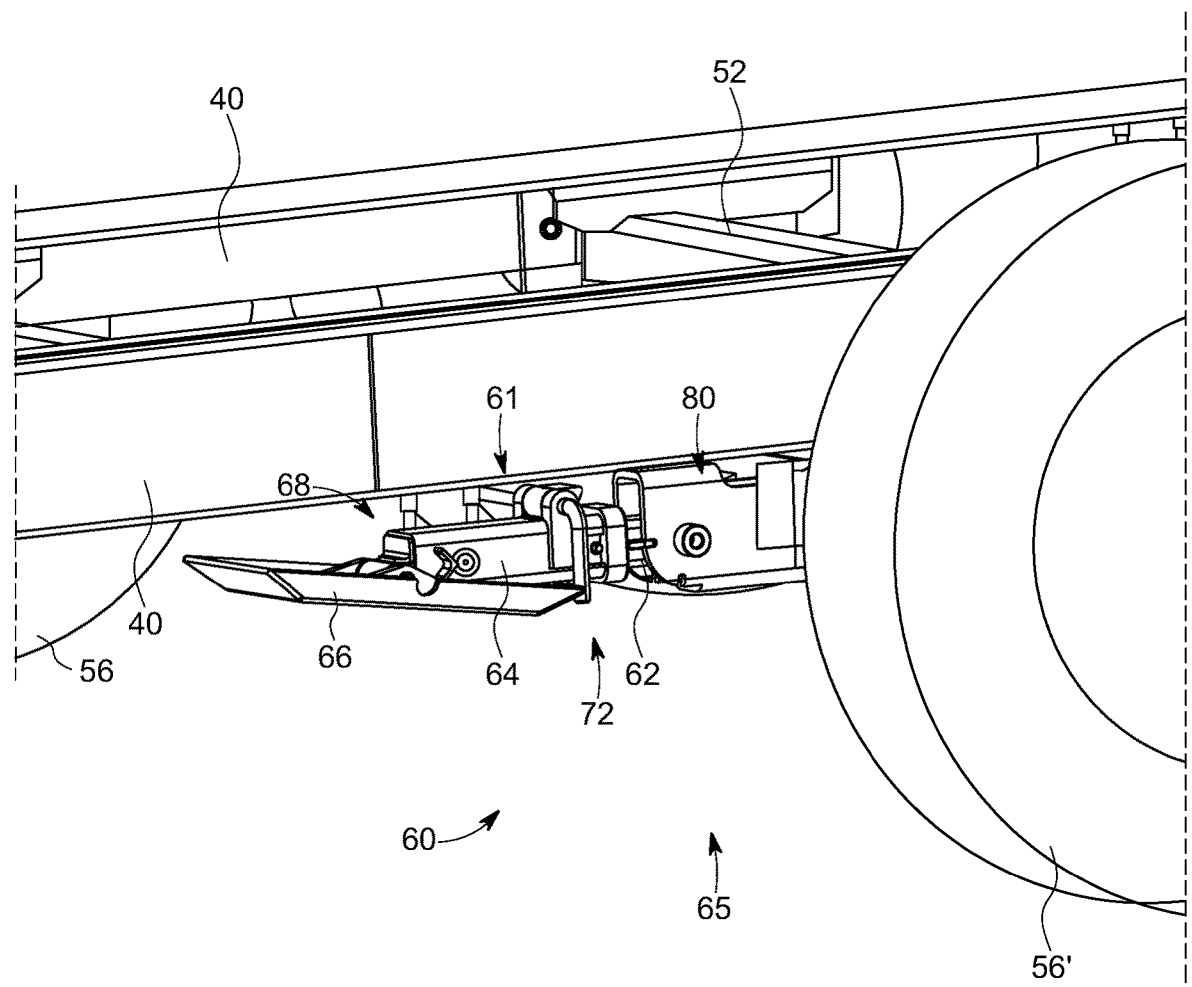
FIG. 2 is a detailed perspective view of the trailer leveling assembly shown in FIG. 1.
Figure 3:
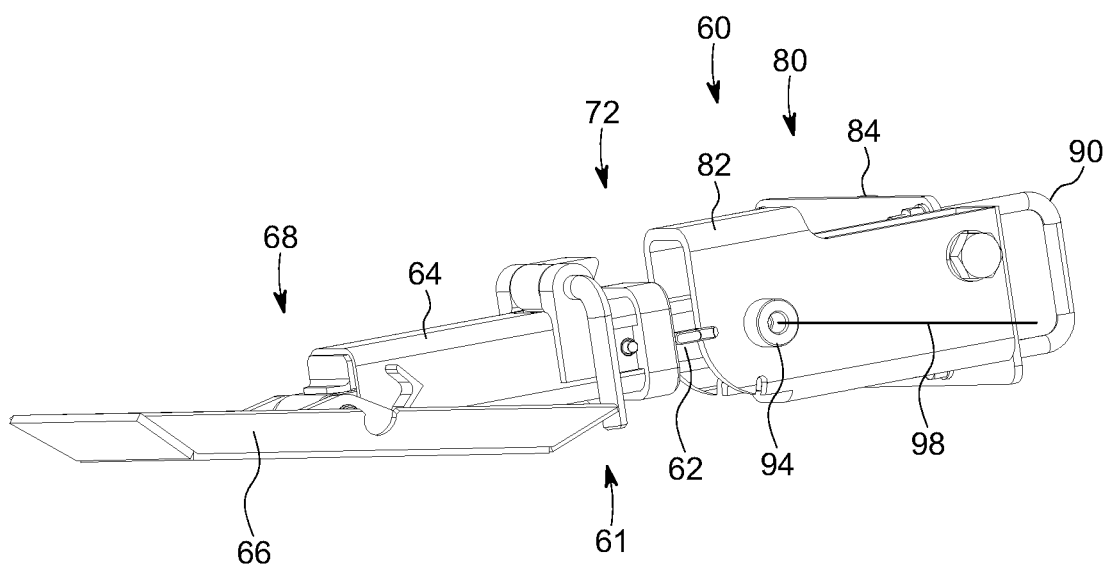
FIG. 3 is an outboard lateral perspective side view of the trailer leveling assembly shown in FIG. 2 exploded from the trailer shown therein.
Figure 4:
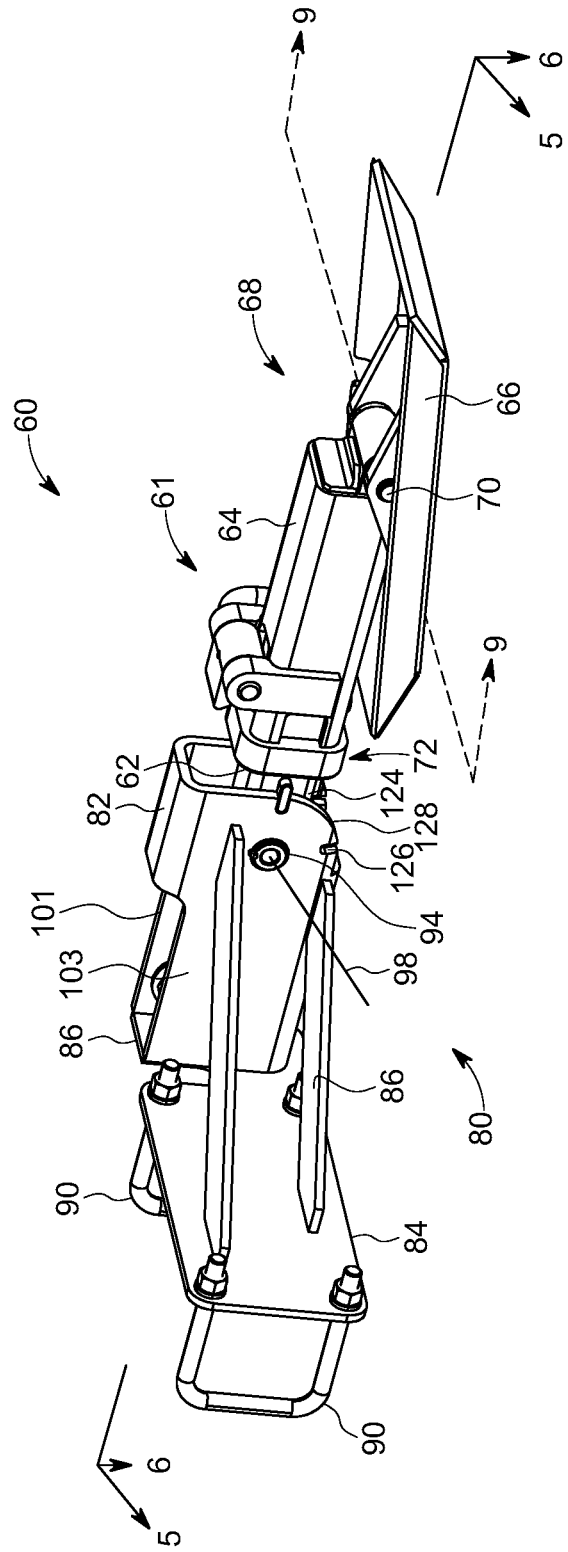
FIG. 4 is an inboard lateral perspective side view of the trailer leveling assembly shown in FIG. 2.

Referring to FIGS. 2-4, each trailer leveling assembly 60 includes a support assembly 61 that is defined by a first member or post 62 that slidably cooperates with a second member, sleeve, or tube 64 in a selectively telescopic manner. A pad or shoe 66 is secured to a cantilevered or free end 68 of tube 64 and is preferably pivotably connected thereto via a pivot pin 70 as disclosed further below with respect to FIG. 9. Shoe 66 is constructed to disperse compressive loads communicated to shoe 66 via post 62 and tube 64 when the respective trailer leveling assembly 60 is deployed as disclosed further below. A second end 72 of tube 64 slidably or telescopically cooperates with post 62 to manipulate a longitudinal length associated with each discrete support assembly 61 as disclosed further below during use of the same to manipulate the levelness of trailer 30.

Still referring to FIGS. 2-4, an optional mount, saddle assembly, or saddle 80 is disposed between each leveling assembly 60 and an underlying structural member of trailer 30. As disclosed above, depending upon the construction of trailer 30 and/or its intended use, each of a discrete axle 52, 54, a respective portion of frame 32, or a portion of deck 44 of trailer 30 is to be considered a structural member capable of accommodating interaction with discrete leveling assemblies 60. It is further appreciated that, with attenuate forethought, any of frame 32, axles 52, 54, and/or deck 44 could be configured during manufacture to include a pertinent number of structures having constructions similar to saddle 80 to accommodate the selectively pivotable supporting of one or more discrete leveling assemblies 60 as disclosed herein thereby rendering saddle 80 optional aside from accommodating retrofitting of existing trailers to cooperate with one or more leveling assemblies 60. It is further appreciated that, whereas a forward driver's side and a rearward passenger's side oriented leveling assembly 60 have generally the same construction, the forward passenger's side and the rearward driver's side leveling assemblies have preferably generally mirror image constructions as the laterally opposite leveling assembly. Such a consideration provides laterally outboard oriented operation of each of the respective leveling assemblies 60 when a trailer is equipped with a plurality thereof.

Exemplary saddle 80 includes a first portion 82 and the second portion 84 that are offset from one another in crossing directions. One or more gussets or braces 86 extend between first portion 82 and second portion 84 of saddle 80 to maintain the desired relative orientation therebetween. One or more securing devices, such as U-bolts for the like 90, cooperate with second portion 84 of saddle 82 and accommodate securing of saddle 80 relative to a respective axle 52, 54 or a respective portion of frame 32 of trailer 30. As alluded to above, it is appreciated that, depending upon the construction and with the configuration associated with respective trailer 30, leveling assembly 60 may omit one or more of first portion 82, second portion 84, braces 86 and/or the entirety of saddles 80 when achieving the desired orientation and cooperation of the respective support assembly 61 relative thereto.

Figure 20:
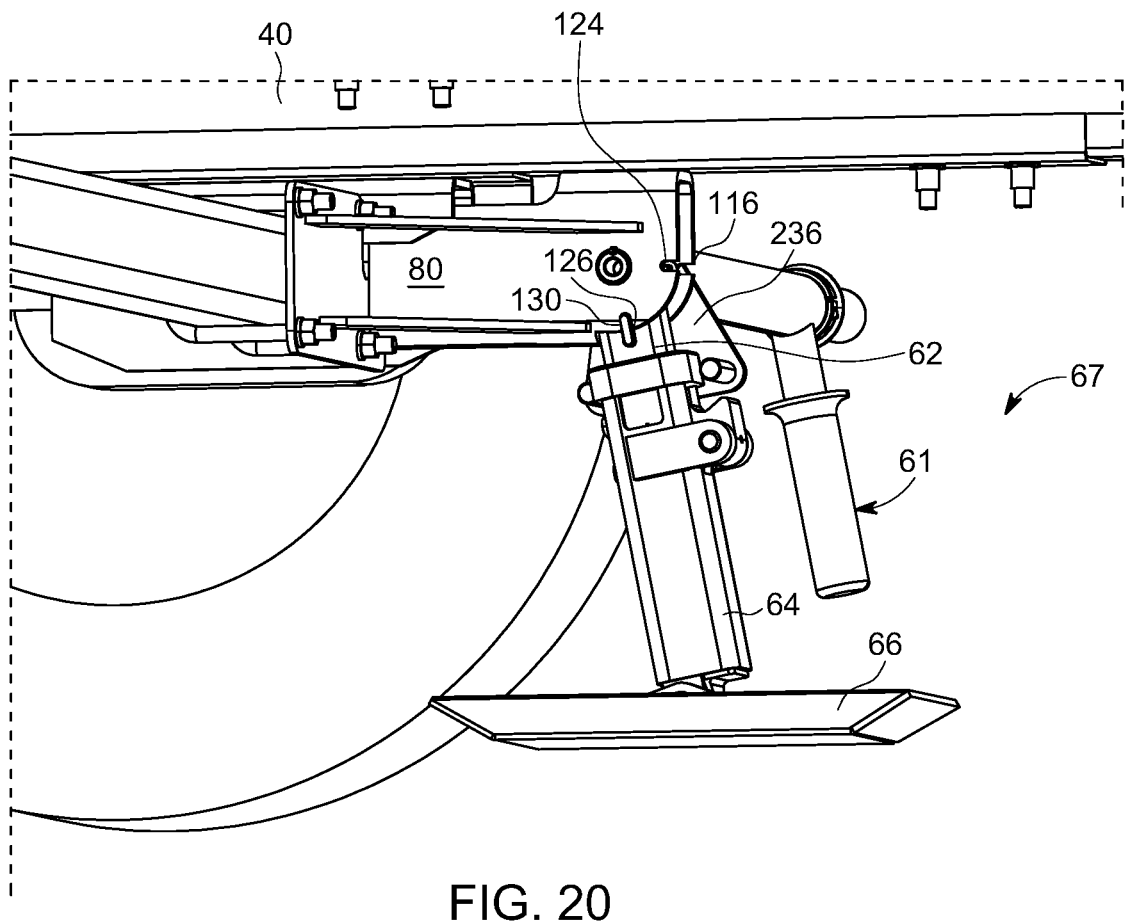
FIG. 20 is an opposite perspective view of optional tool and the respective trailer leveling assembly shown in FIG. 19 with a rotational stop and catch engaged with one another.

Regardless of the inclusion or exclusion of saddle 80, each support assembly 61 is constructed to be pivotably connected to trailer 30 so as to be moveable relative to trailer 30 between a stowed position or orientation (FIG. 2) and a deployed or in-use position or orientation (FIG. 20). It is further appreciated that support assemblies 61 can be provided to be removable from trailer 30 to accommodate storage of the same at locations more protected from the environment associated with use or extended periods of non-use of trailer 30 and/or one or more leveling assemblies 60.

Referring to FIGS. 3-8, a pivot pin 94 cooperates with first portion 82 of saddle 80 and cooperates with post 62 of support assembly 61 such that post 62 is selectively rotatable relative to saddle 80 about an axis, indicated by line 98, to effectuate rotation of each respective support assembly 61 between the stowed position or orientation 65 (FIG. 2) and the deployed or in-use rotational position or orientation 67 (FIG. 20) relative to an underlying trailer 30. It is appreciated that, depending upon the conditions and/or contours associated with ground surface 58, one or more rotational and/or relative respective telescopic orientations associated with support assemblies 61 may be provided to define discrete respective relative in-use orientations of support assembly 61 relative to the underlying trailer 30.

Figure 6:
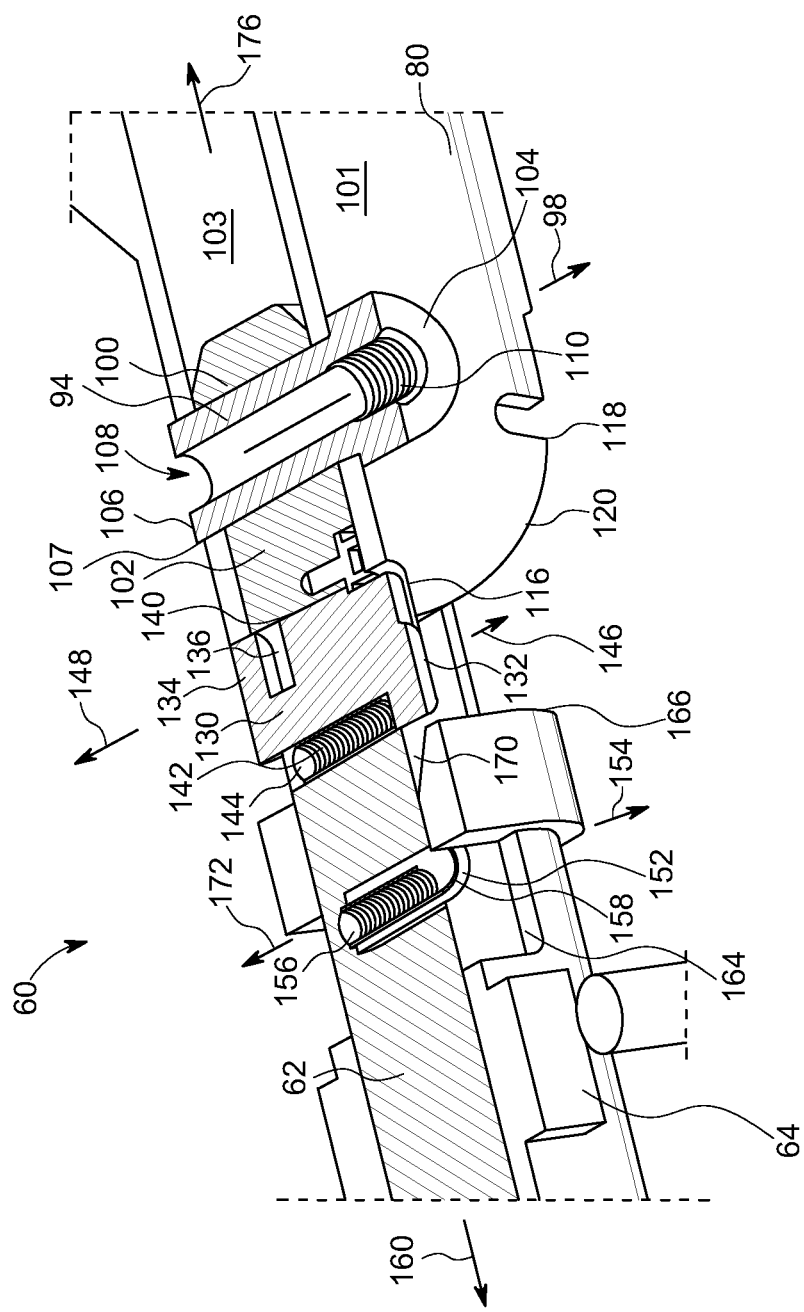
FIG. 6 is a longitudinal perspective cross-sectional view of a catch portion of the trailer leveling assembly shown in FIG. 2 taken along line 6-6 shown in FIG. 5.
Figure 7:
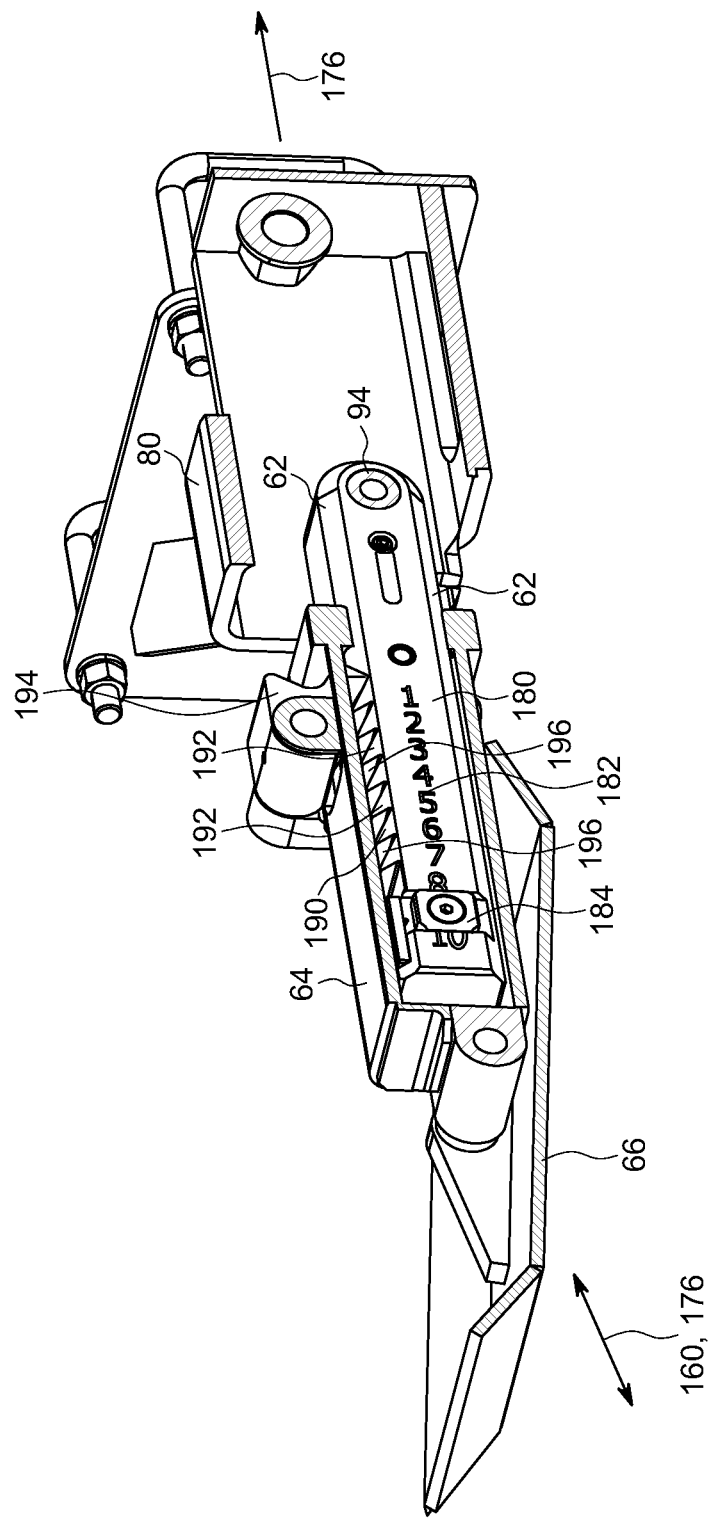
FIG. 7 is a view similar to FIG. 5 and shows an extension demarcation provided on trailer leveling assembly shown in FIG. 2.
Figure 8:
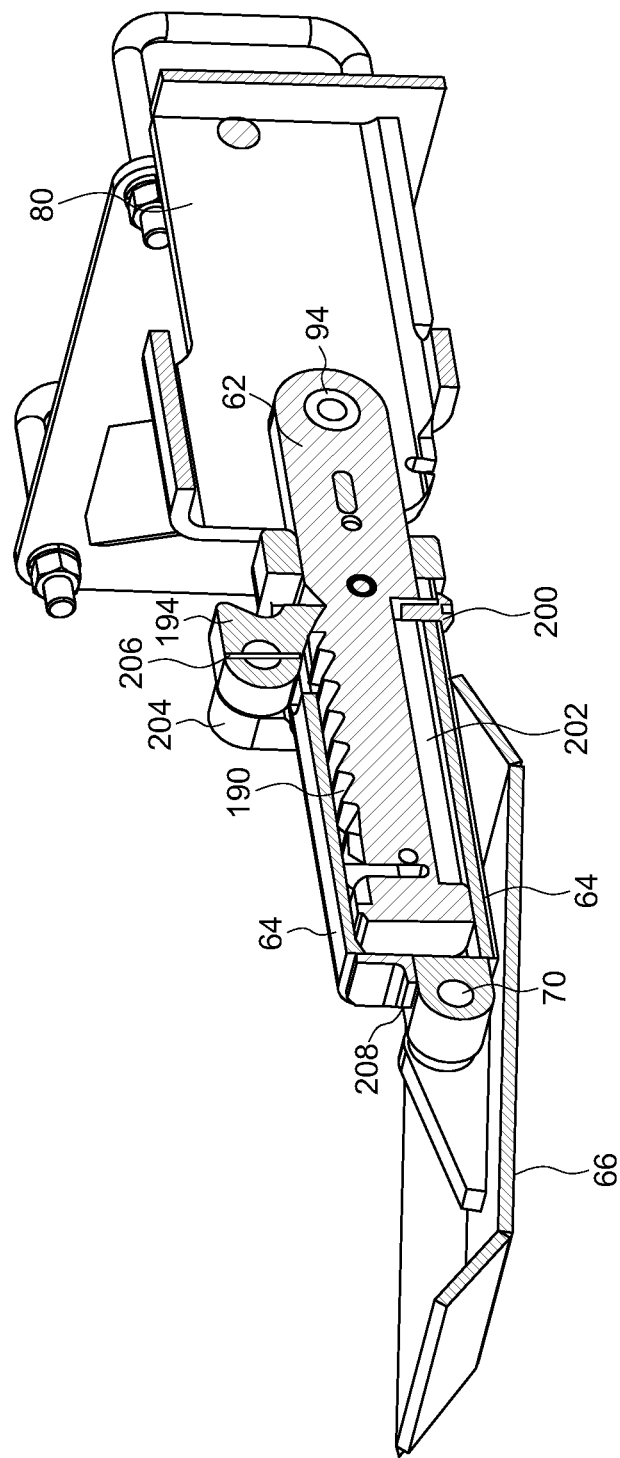
FIG. 8 is a longitudinal centerline cross-sectional view of the trailer leveling assembly shown in FIG. 5.

Referring to FIGS. 6-8, pivot pin 94 passes through an opening 100 formed in a respective end portion 102 of post 62. Opposing ends of pivot pin 94 extend through respective opposing walls 101, 103 of saddle 80 such that each discrete leveling assembly 60 is pivotably connected relative to a respective saddle 80 associated therewith. Each pivot pin 94 includes a head portion 104 and a channel 106 that are formed proximate respective opposing ends thereof. Channel 106 is shaped to receive a snap ring 108, spring clip, or the like, so as to maintain the desired axial orientation of pivot pin 94 relative to saddle 80 and post 62. It is appreciated that various alternative methodologies may be employed to secure pivot pin 94 relative to saddle 80 and post 62 while maintaining a rotatable relationship therebetween.

A bore 108 is formed in at least a portion of pivot pin 94 and a number of threads 110 are formed along at least a portion thereof. Bore and/or threads 110 are preferably constructed to removably cooperate with an optional tool assembly 220 as disclosed further below and which is configured to effectuate the desired operation of each discrete leveling assembly 60 from locations that are mostly, if not entirely, laterally outboard of the underlying trailer assembly 30. Tool assembly 220 is constructed to cooperate with each leveling assembly 60 and effectuate operation thereof with respect to moving each respective support assembly 61 between stowed positions 65 and in-use positions 67 as is also disclosed further below.

As shown in FIG. 6, wall 101 of saddle 80 includes a first stop 116 and a second stop 118 that are formed in an end portion 120 thereof. First stop 116 and second stop 118 are rotationally offset relative to one another with respect to axis 98 defined by pin 94. Referring briefly back to FIG. 4, laterally inboard facing side wall 103 of saddle 80 also includes a first stop 124 and a second stop 126 that are rotationally offset from one another and are laterally aligned with a respective one of first stop 116 and second stop 118 defined by first wall 101. As disclosed further below, stop pair 116, 124 and stop pair 118, 126 are constructed to selectively cooperate with a catch supported by post 62 and define discrete rotational orientations of support assembly 61 relative to saddle 80. It is further appreciated that, although only two respective stop pairs are shown formed in each saddle 80, other numbers or constructions of discrete stops or stop pairs are envisioned. Regardless of the specific number and construction, the stops are constructed to selectively prevent rotational translation between post 62 and the respective saddle 80 associated therewith when a respective catch 130 is engaged therewith.

Referring to FIGS. 6-13, first catch 130 is supported by post 62 and is slideable relative thereto in a lateral or crossing direction relative to a longitudinal axis of support assembly 61. Catch 130 extends between a first end 132 and a second end 134 that define the generally opposite longitudinal ends of the catch and which are oriented toward the respective lateral inboard and lateral outboard sides of post 62. A channel 136 is formed in at least one of ends 132, 134 of catch 130 and oriented toward a saddle facing side 140 of catch 130 and proximate the interaction of catch 130 with saddle 80. When catch 130 is displaced to accommodate rotational translation of post 62 relative to saddle 80, channel 136 is aligned the plane defined by sidewall 103 of saddle 80 such that post 62 is rendered rotatable relative thereto.

A biasing device 142, such as a spring or the like, is disposed in a cavity 144 defined by post 62 and acts upon catch 130 to bias catch 130 in an outward lateral direction, indicated by arrow 146, relative to the orientation of post 62 and the underlying trailer assembly 30, such that the opposing ends 132, 134 of catch 130 selectively engage respective pairs of stops 116, 124, and 118, 126 defined by saddle 80 at various rotational positions of support assembly 61 relative to saddle 80 when catch 130 is not otherwise displaced by user interaction therewith. That is, deflection of catch 130 from an at-rest orientation relative to saddle 80 is required to disengage catch 130 from saddle 80 and thereby accommodate rotational translation of support assembly 61 relative to saddle 80 when translation between the stowed and in-use orientations is desired. Such a construction further prevents inadvertent or unintended rotational translation of support assembly 61 relative to saddle 80.

As alluded to above, inward lateral translation of catch 130 relative to post 62, indicated by arrow 148, allows channel 136 of catch 130 to be generally aligned with wall 103 defined by saddle 80 and end 132 of catch 130 to achieve a position wherein end 132 does not interfere with rotational translation of catch 130 relative to wall 101 of saddle 80. When translated in the inward lateral direction relative to post 62 over the bias force provided by spring 142, catch 130 and post 62 achieve an orientation when support assembly 61 is rendered rotatable relative to saddle 80. That is, inward lateral displacement of catch 130 facilitates rotation of post 62 about axis 98 to allow catch 130 to selectively engage respective stops 116, 124 when oriented in the stowed orientation 65 and rotation of post 62 in a downward direction relative to axis 98 allows catch 130 to engage stops 118, 126 defined by saddle 80 when oriented in the deployed or in-use position or orientation as shown in FIG. 20.

Support assembly 61 of leveling assemblies 60 include a second catch 152 that is biased in a similar outward lateral direction, indicated by arrow 154, relative to post 62 by a biasing device such as a spring 156 or the like associated therewith. Catch 152 includes a head portion 158 that, when catch 152 is biased in the outward lateral direction 154 relative to post 62, selectively interferes with slidable telescopic cooperation of tube 64 relative to post 62 in an outward longitudinal direction, indicated by arrow 160. Tube 64 includes a pocket, cavity, or cut out 164 that is shaped to accommodate the outward lateral deflection of catch 152 relative to the travel path associated with slidable cooperation of tube 64 relative to post 62. When oriented in the outward laterally biased position, catch 152 restricts longitudinal translation of tube 64 relative to post 62 in direction 160. When oriented in the stowed configuration, catch 152 acts to restrain longitudinal translation of tube 64 relative to post 62.

A saddle facing end 166 of tube 64 defines a ramp or contour 170 on a post facing side therein. Contour 170 is shaped and positioned to translate catch 152 in an inward lateral direction, indicated by arrow 172, relative to post 62 during translation of tube 64 along post 62 in a direction toward pivot pin 94. Said in another way, when returned to the stowed or non-use orientation, tube 64 can be slid in a telescopic manner along post 62 in direction 176 and interacts with catch 152 in a manner that results in automatic actuation of catch 152 when tube 64 achieves a position wherein catch 152 engages cut out 164. Such a construction secures tube 64 relative to post 62 in the shortest available longitudinal length of support assembly 61 when not in use and regardless of the relative rotational position of support assembly 61 relative to saddle 80.

Figure 5:
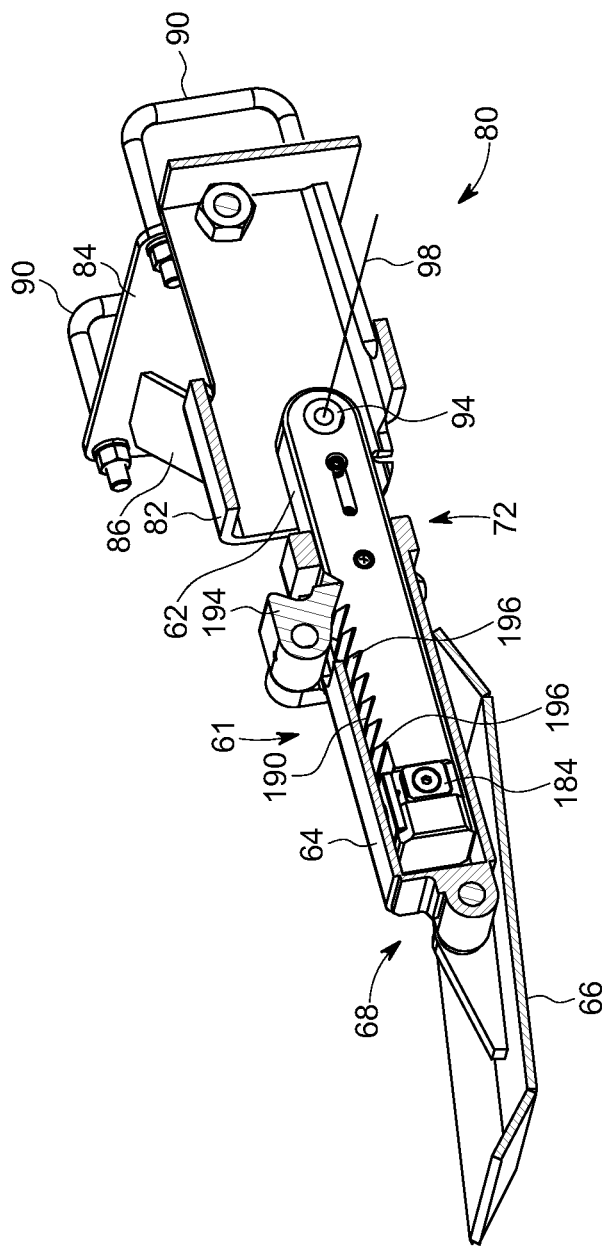
FIG. 5 is a longitudinal perspective cross-sectional view the trailer leveling assembly shown in FIG. 2 taken along line 5-5 shown in FIG. 4.

Referring to FIGS. 5, 7, and 8, lateral outboard facing surface 180 of post 62 includes one or more indicators 182 associated with providing an indication as to the relative longitudinal orientation of tube 64 relative to post 62 when deployed. Indicators 182 provide an indication as to the longitudinal length associated with a discrete support assembly 61 during use thereof. A catch 184 is secured to post 62 and, once assembled, is constructed to prevent separation between post 62 and tube 64 during movement in longitudinal directions 160, 176.

A portion of an outward directed surface of post 62 includes a rack 190 that is defined by a plurality of teeth 192 that are shaped and oriented to cooperate with a pawl 194 that is rotationally supported by tube 64. Pawl 194 is rotationally supported by tube 64 and shape to selectively cooperate with discrete cavities 196 defined by adjacent teeth 192 of rack 190. When oriented to cooperate with or engage rack 190, pawl 194 prevents longitudinal translation of tube 64 relative to post 62 in direction 176. However, even when engaged with rack 190, pawl 194 and rack 190 are constructed to allow translation of tube 64 relative to post 62 in the opposite or lengthening longitudinal direction when support assembly 61 is not subject to a compressive force. Such a consideration allows each support assembly 61 to elongate to a configuration wherein the support assembly is either fully extended or engaged between trailer 30 and support surface 58 when pawl 194 and rack 190 are engaged with one another.

Referring to FIG. 8, fastener 200 cooperates with tube 64 and extends into a cavity 202 formed between post 62 and tube 64. Fastener 200 further limits or otherwise restricts undesired or overextension or dissociation in the longitudinal displacement direction of tube 64 relative to post 62 during use thereof. As disclosed further below, pawl 194 is secured to tube 64 via an operator or handle 204 that is rotationally supported by tube 64 by a roll pin 206 or the like. The cooperation of handle 204 with tube 64 and pawl 194 allows pawl 194 to be selectively rotated relative to tube 64 between and in-use or rack engaging position and a disengaged with rack orientation as disclosed further below.

Figure 9:
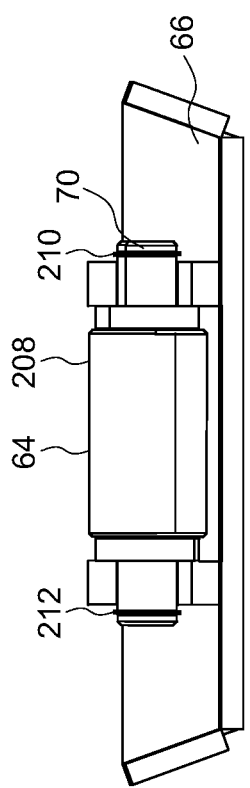
FIG. 9 is a partial cross-sectional view of trailer leveling assembly taken along line 9-9 shown in FIG. 4.

Handle 204 is constructed to accommodate remote actuation and/or operation of pawl 194 relative to rack 190 to effectuate the desired longitudinal translation of tube 64 relative to post 62 between the extended and the retracted positions associated with the stowed and in-use orientations of support assembly 61 as alluded to above. Referring to FIGS. 8 and 9, shoe 66 is rotationally connected to an end 208 of tube 64 via pivot pin 70 or the like. As shown in FIG. 9, respective spring clips 210, 212 secure shoe 66 relative to tube 64 such that shoe 66 is rotatable relative thereto during interaction of shoe 66 with the ground or support surface 58 as disclosed further below.

Figure 10:
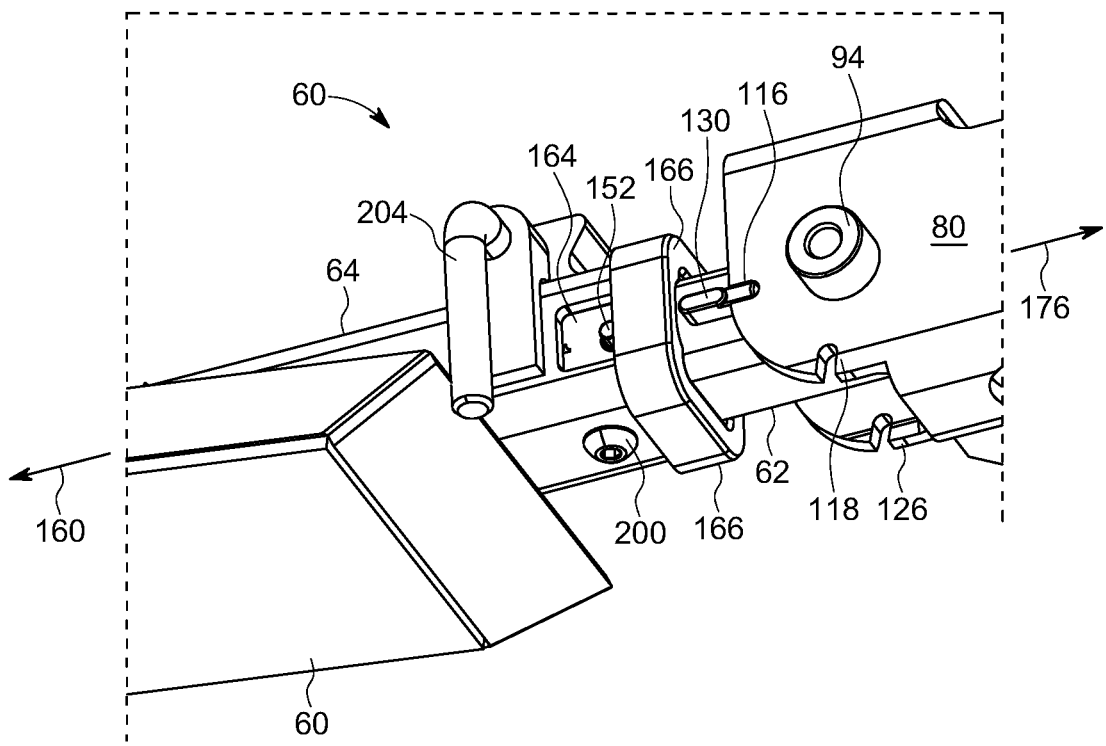
FIG. 10 is a lower rearward outboard perspective view of trailer leveling assembly shown in FIG. 2.
Figures 11, 12:
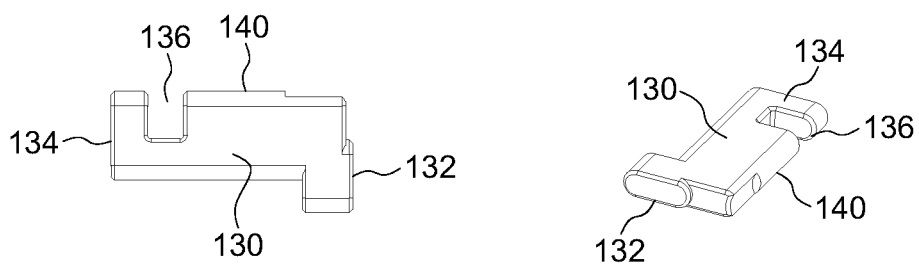
FIG. 11 is a plan view of a catch of the trailer leveling assembly shown in FIG. 2.
FIG. 12 is a perspective view of the catch shown in FIG. 11.

As shown in FIG. 10, when not in use or during a transport event, tube 64 can be translated in a slideable or telescopic manner along post 62 toward saddle 80 such that end 166 of tube 64 achieves a position of close proximity to catch 130 and catch 152 extends into cut out 164 defined by tube 64. Catch 130 and fastener 200 prevent continued longitudinal translation of tube 64 along post 62 in direction 176 whereas catch 152 prevents longitudinal translation of tube 64 along post 62 in direction 160 thereby providing a secured stowed orientation of support assembly 61 of each leveling assembly 60 relative to saddle 80 when oriented in the rotationally and longitudinally stowed positions.

Figure 13:
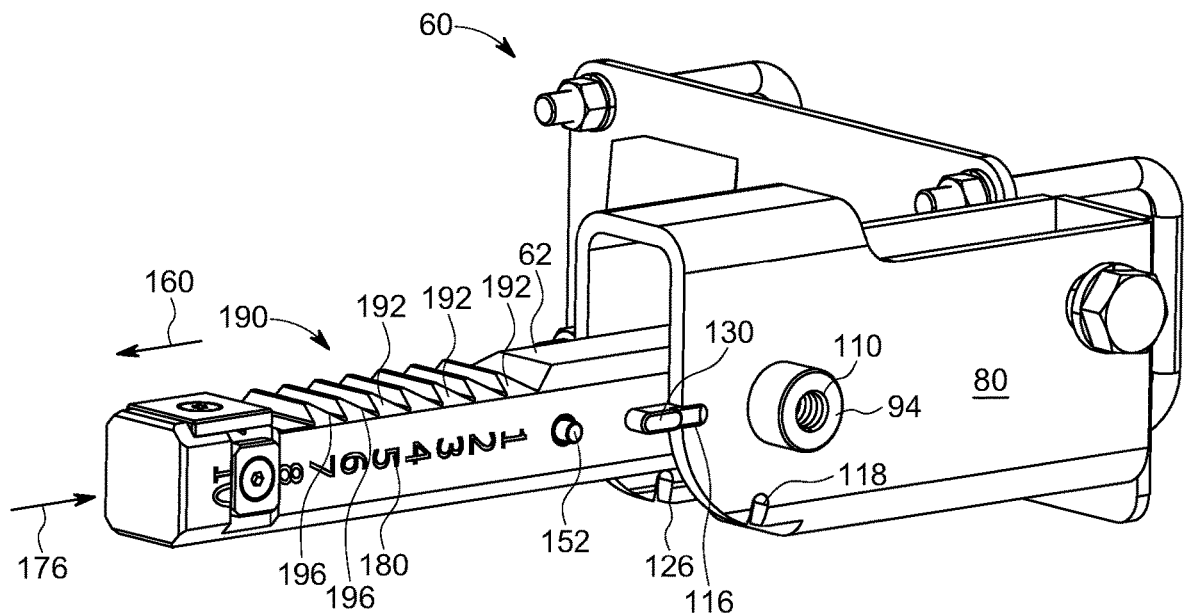
FIG. 13 is a forward outboard perspective view of the trailer leveling assembly shown in FIG. 2 with a tube and respective ground support shoe removed from a post thereof.

FIG. 13 shows post 62 of leveling assembly 60 with the tube 64 and shoe 60 dissociated therefrom. As shown therein, teeth 192 of rack 190 are oriented to extend in a generally downward facing direction 160 such that cavities 196 are oriented to provide a captive tactile association or engagement with pawl 194. That is, when pawl 194 is engaged with any respective cavity 196 defined by rack 190, the cooperation between pawl 194 and rack 190 prevents inadvertent or undesired disengagement between pawl 194 and any respective cavity 196 of rack 190. Preferably, teeth 192 and cavities 196 of rack 190 are construction to bias pawl 194 rotationally toward post 62 when pawl 194 is engaged therewith. As disclosed further below, the engagement of pawl 194 with respective cavities 196 prevents longitudinal translation of tube 64 relative to post 62 in direction 176 during use of the leveling assembly 60.

Figure 14:
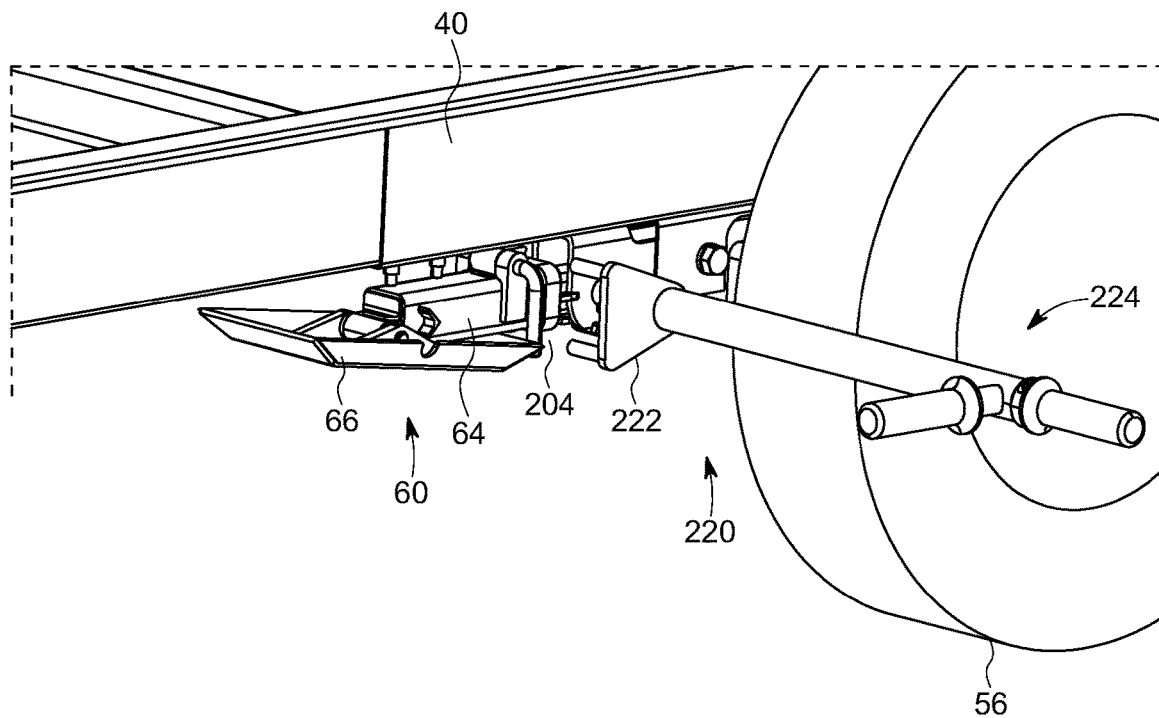
FIG. 14 is a lateral outboard perspective views of the trailer leveling assembly shown in FIG. 2 and an optional tool associated therewith when the discrete trailer leveling assembly is oriented in a stowed position.
Figure 15:
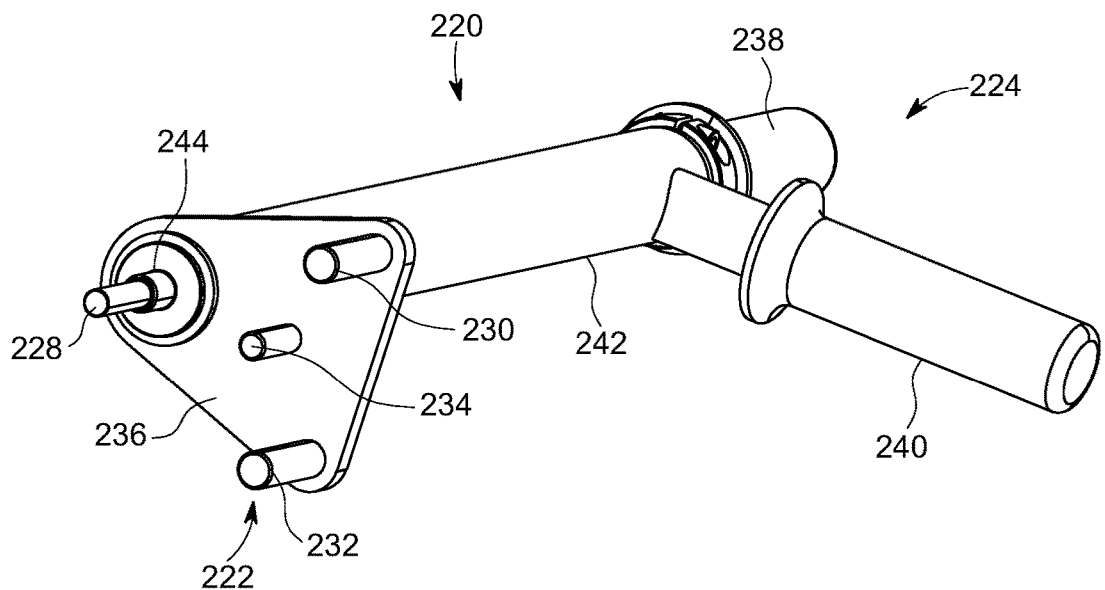
FIG. 15 is a perspective view of a trailer leveling assembly engagement end of the optional tool shown in FIG. 14.
Figure 16:
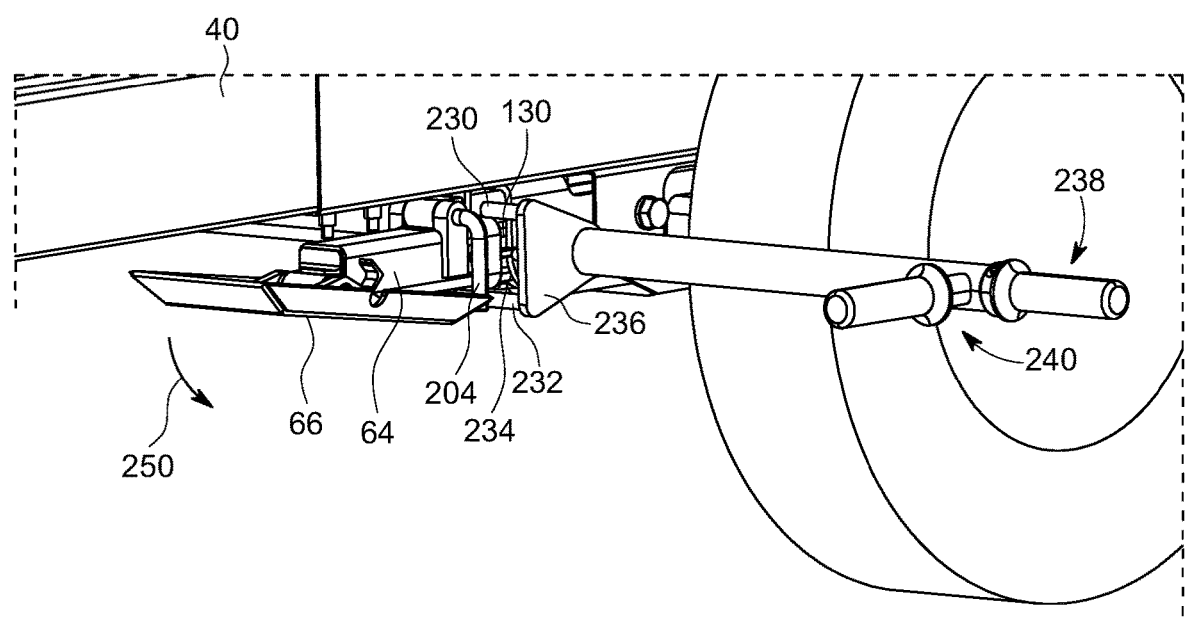
FIG. 16 is a view similar to FIG. 14 of the optional tool shown therein with respective posts of the optional tool partially flanking a tube of the respective trailer leveling assembly.
Figure 17:
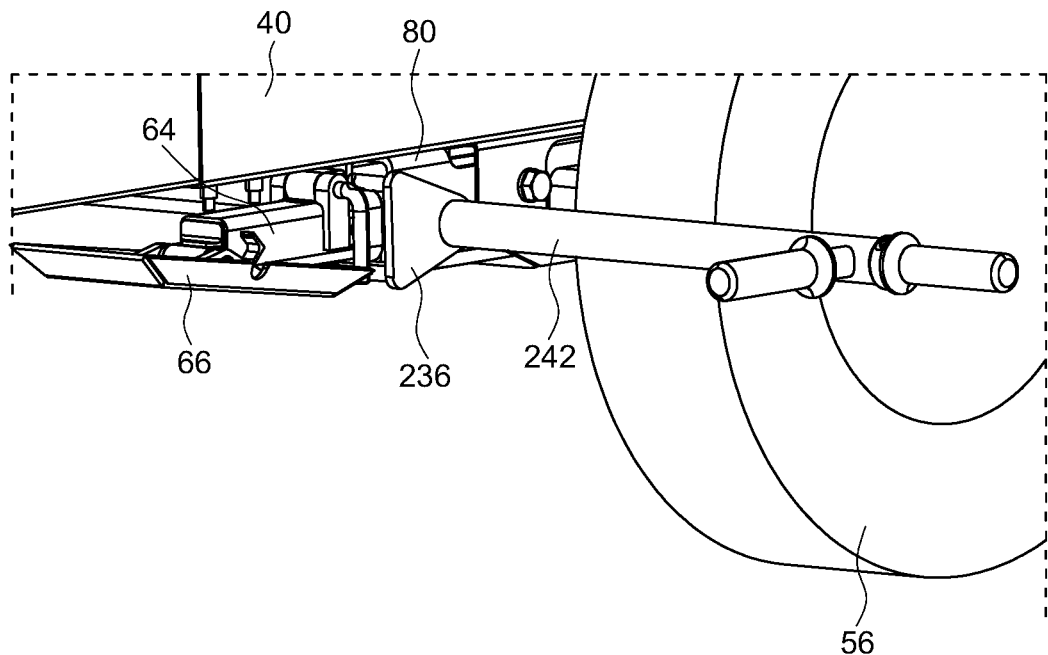
FIG. 17 is a view similar to FIG. 16 with the respective posts of the optional tool positioned to fully flank the tube of the respective trailer leveling assembly.
Figure 18:
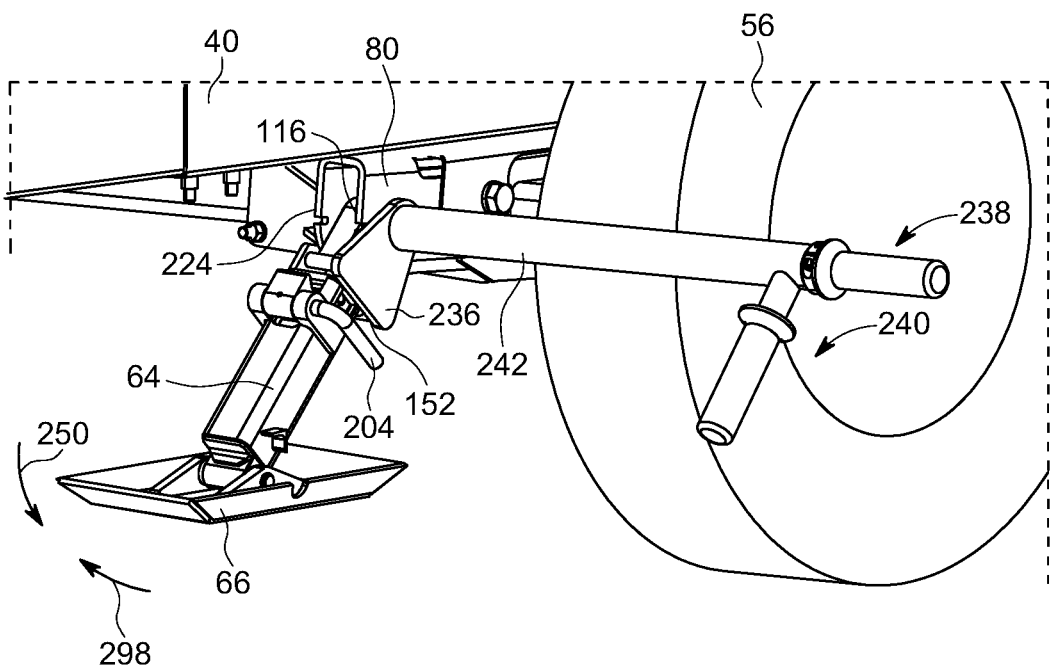
FIG. 18 is a view similar to FIG. 17 with the respective trailer leveling assembly rotated toward a partially deployed orientation.

Although leveling assemblies 60 are each capable of being fully manually operable via direct user interaction therewith, the location of the same generally below the frame members 40 and laterally inboard relative to the outer edges of trailer 30 can be problematic some users and during some conditions. As shown in FIG. 14, an optional tool assemblage or simply tool 220 is provided and can be employed to facilitate operation of each discrete leveling assembly 60 between the stowed and deployed orientations from locations laterally outboard from a vertical footprint of trailer assembly 30.

Tool 220 includes a drive portion 222 and a handle portion 224 that are oriented at generally opposite longitudinal ends thereof. As disclosed further below, drive portion 222 tool 220 is constructed to facilitate selective operation of respective catches 130, 152 to effectuate the selective deployment of discrete leveling assemblies 60 from a position generally laterally outboard relative to wheel 56 of trailer 30. Tool 220 mitigates the necessity of the user physically interacting directly with leveling assemblies 60 associated with the trailer assembly 30 and allows the user to remain positioned laterally outboard relative thereto when discrete leveling assembly 60 are intended to be moved between the stowed and the deployed orientations relative to trailer assembly 30.

Referring to FIGS. 15-19, operator portion 222 of tool assembly 220 includes a plurality of posts 228 230, 232, 234 that extend from a base 236 thereof. Handle portion 224 includes a first grip 238 and a second grip 240 that are secured to respective portions thereof. Grip 238 is configured to be rotatable relative to a tube 242 of tool assembly 220 so as to effectuate rotation of a threaded portion 244 associated with drive portion 222 thereof. Threaded portion 244 is constructed to selectively cooperate with threaded portion 110 defined by pivot pin 94 when tool 220 is engaged therewith. During cooperation therebetween, posts 230, 232 of drive portion 222 generally flank tube 64 of the discrete leveling assembly 60 with which tool assembly 220 is associated.

During threadable engagement between threaded portion 244 of tool 220 with threaded portion 110 of pivot pin 94, post 234 interacts with catch 130 so as to bias catch 130 in the inward lateral direction relative to post 62 thereby causing disengagement between catch 130 with respective stop pairs 116, 124; 118, 126 of the opposing lateral sides of saddle 80 such that the respective support assembly 61 is rendered rotatable relative to saddle 80. From the stowed orientation shown in FIG. 15, it should be appreciated that engagement of post 234 with catch 130 biases catch 130 in an inward lateral direction such that catch 130 disengages from stops 116, 124 thereby rendering post 62 rotatable in a generally downward rotational direction, indicated by arrow 250, toward the deployed orientation 67. As disclosed further below, extraction of tool 220 from pivot pin 94 allows catch 130 to engage stops 118, 126 thereby rotationally securing support assembly 61 in the rotationally deployed orientation relative to saddle 80.

As shown in FIGS. 18-21, once catch 130 has been disengaged from stops 116, 124 defined by saddle 80, support assembly 61 can be rotated in the downward rotational direction 250 toward the rotationally deployed orientation. Referring to FIG. 20, when catch 130 achieves an orientation relative to saddle 80 such that catch 130 is generally aligned with stops 118, 126, biasing device 142 effectuates outward lateral translation of catch 130 relative to post 62 such that the generally opposing longitudinal ends of catch 130 cooperate with respective stops 118, 126 defined by saddle 80. Such cooperation generally secures support assembly 61 in the downward depending rotational orientation relative to saddle 80 during deployment thereof.

Figure 19:
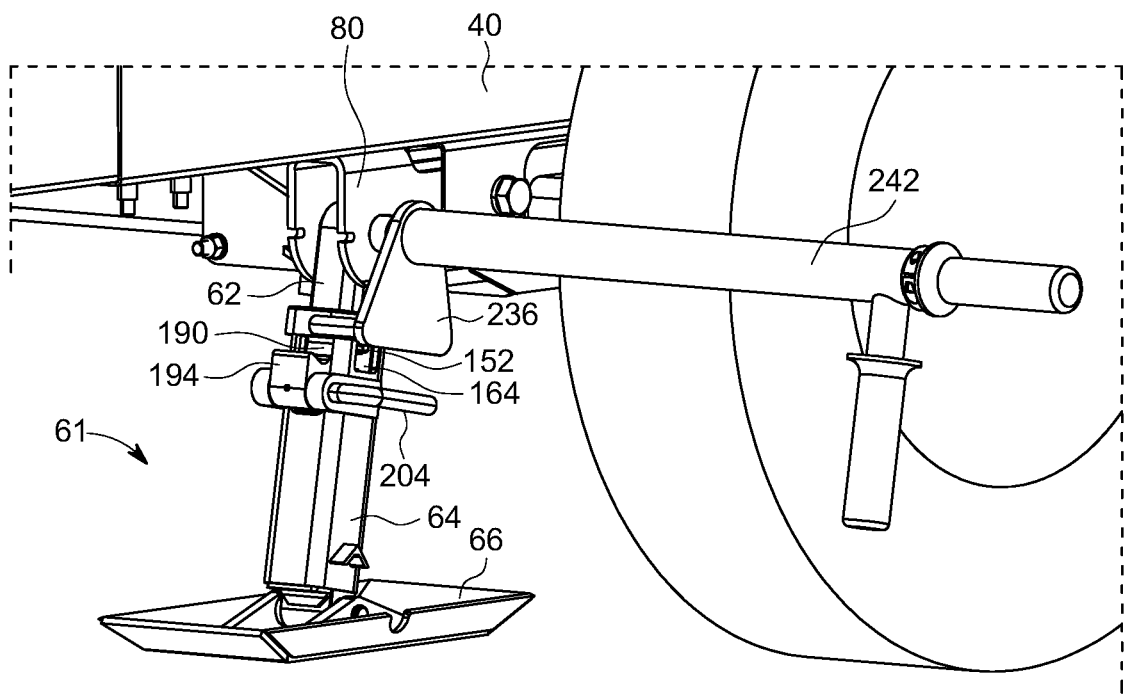
FIG. 19 is a view similar to FIG. 18 with the respective trailer leveling assembly rotated toward a rotationally securable deployed orientation.

Referring to FIG. 19, even though rotated initially in the downwardly depending orientation, post 62 and tube 64 maintain a generally short telescopic orientation relative to one another via the cooperation of catch 152 with cut out 164 defined by tube 64. As alluded to above, the cooperation of rack 190 with pawl 194 are oriented such that tube 64 freely slidably cooperates with post 62 in the downward or longitudinally lengthening or extending slidable direction when catch 152 is disengaged from cut out 164 and regardless of the rotational orientation of pawl 194 relative to rack 190. As disclosed further below, to allow shortening of support assembly 61 during stowage of the same, handle 204 and pawl 194 of support assembly 61 are rotatable relative to tube 64 between the rack engaged orientation (FIGS. 21-24) and a rack disengaged orientation (FIGS. 25-26).

Figure 21:
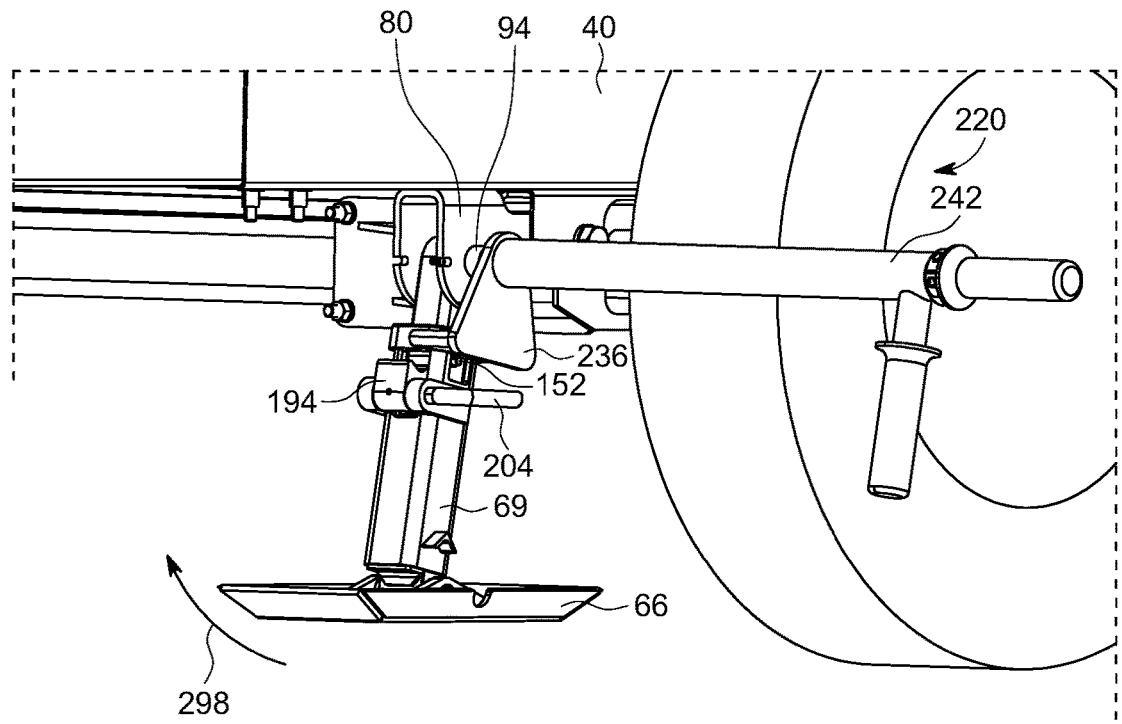
FIG. 21 is a view similar to FIG. 19 of the optional tool and the respective trailer leveling assembly when the rotational stop and catch are engaged with one another as shown in FIG. 20.
Figure 22:
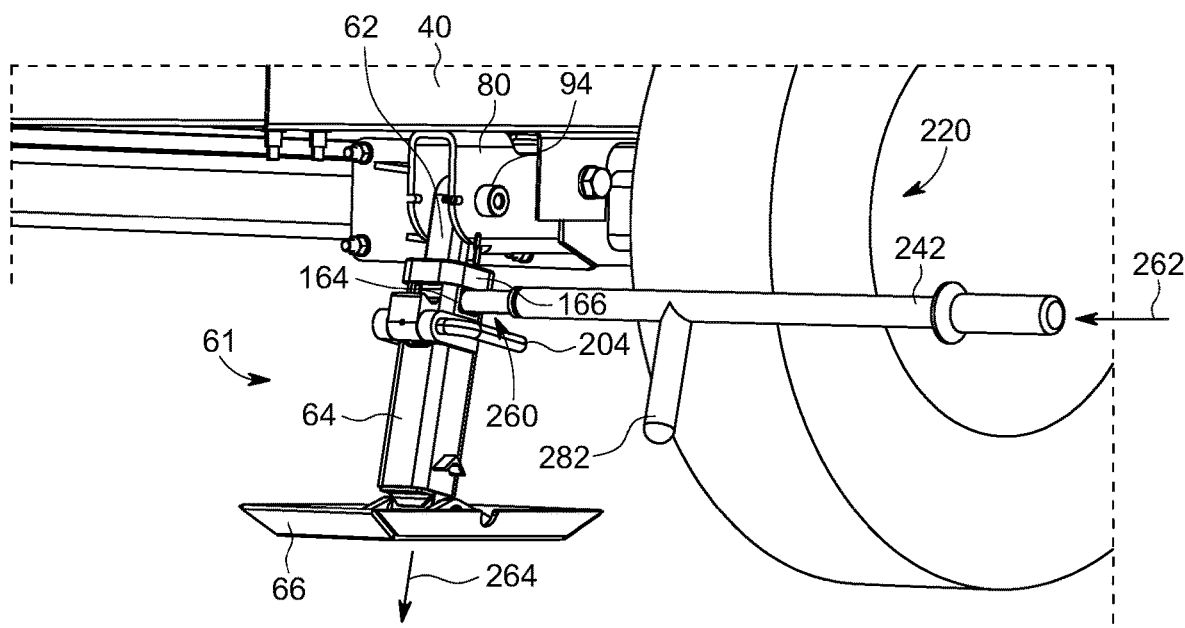
FIG. 22 is a view similar to FIG. 19 with an operator end of the optional tool dissociated therefrom and a terminal end of the optional tool assembly engaged with the respective trailer leveling assembly.
Figure 23:
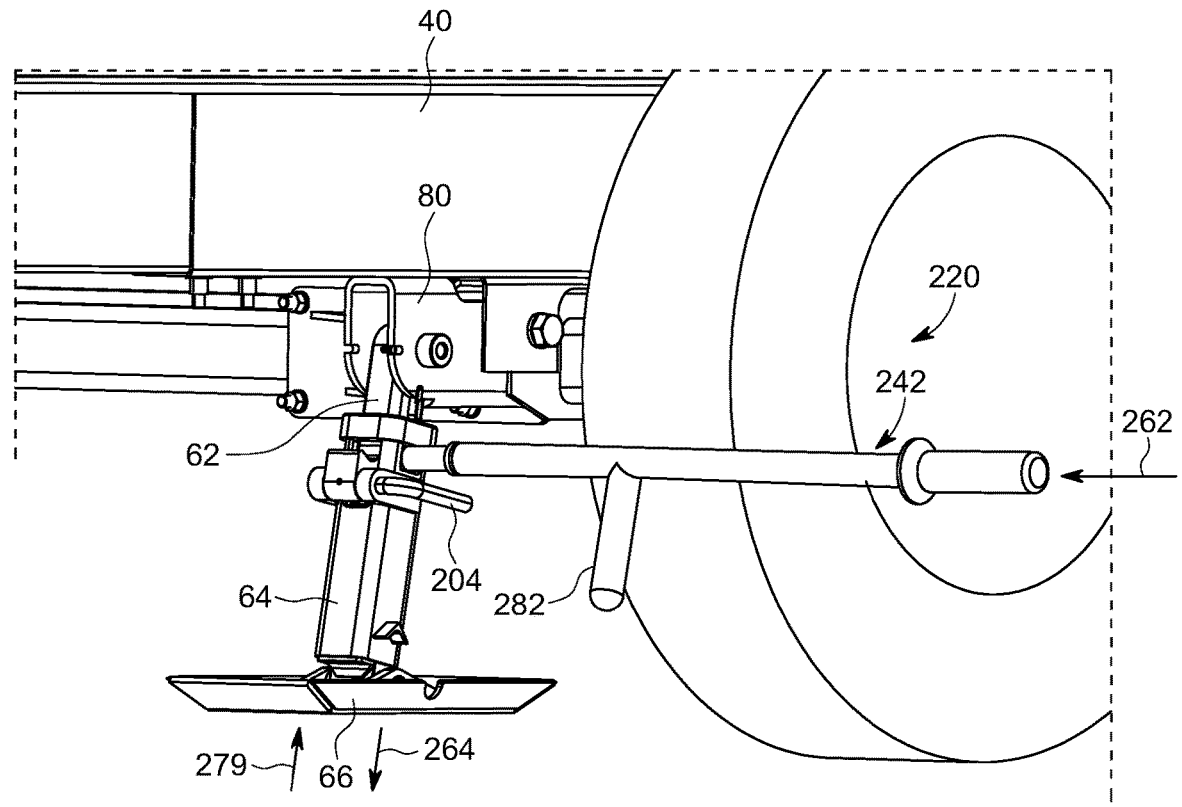
FIG. 23 is a view similar to FIG. 22 wherein the terminal end of the optional tool is engaged with a catch configured to hinder telescopic operation of the respective trailer leveling assembly.
Figure 24:
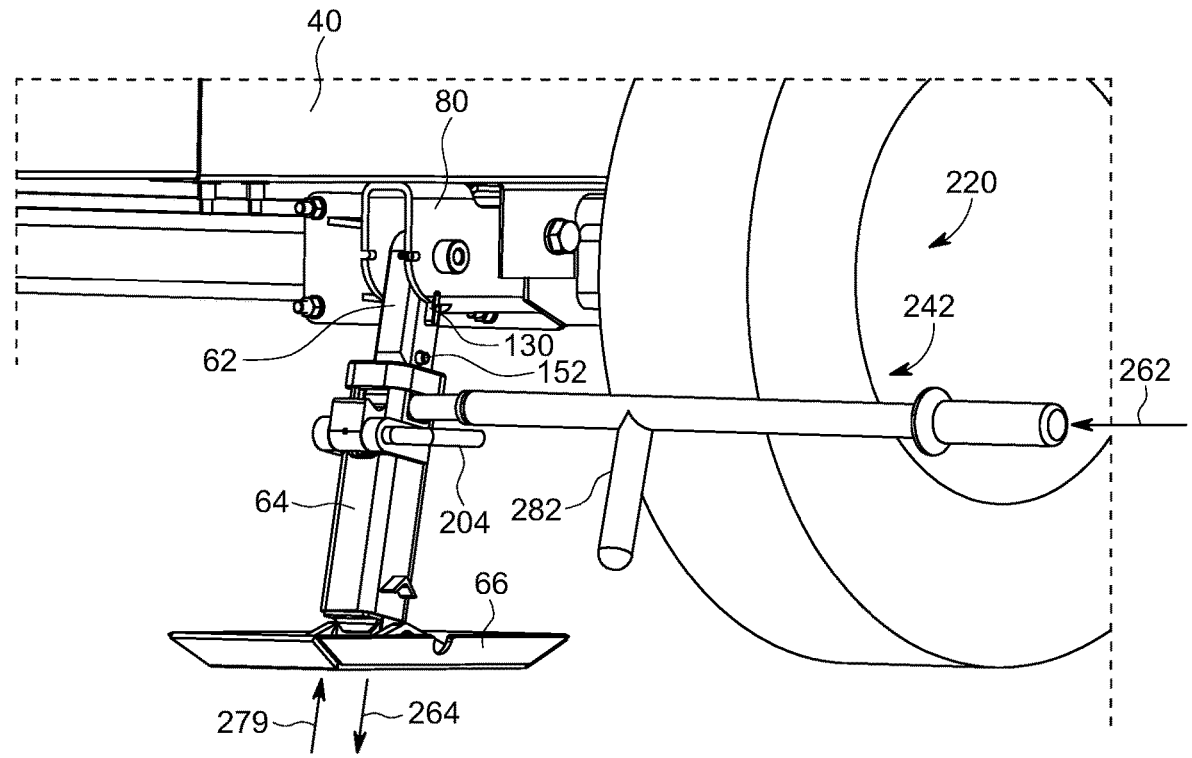
FIG. 24 is a view similar to FIG. 23 wherein the optional tool is engaged with a handle associated with the respective trailer leveling assembly.

As shown in FIGS. 21-24, once support assembly 61 has been rotated toward the deployed position and catch 130 has engaged stops 118, 126 via at least partial disengagement of tool 242 from pivot pin 94, operator end 236 of tool 242 can be selectively disengaged from tool assembly 220 thereby exposing a terminal end 260 thereof. As disclosed further below, an optional lever handle 282 can be selectively engaged with tool 242 to assist the user with rotation thereof upon removal of the outer sleeve thereof. Alternatively, tool assembly 220 can include two discrete independent tools as shown in FIGS. 21 and 22, respectively. Terminal end 260 of optional tool assembly 220 is preferably constructed to cooperate with cavity 164 defined by tube 64 to engage catch 152 and to effectuate the lateral translation thereof relative to tube 64. Said in another way, user pushing of tool assembly 220 in the direction indicated by arrow 262 shown in FIG. 22 allows terminal end 166 of tube 64 to slideably bypass catch 152 and thereby translate in downward longitudinal direction 264 along post 62 until shoe 60 impacts a ground surface 58, blocking, or the like, disposed generally thereunder. At this point, support assembly 61 is oriented to be loaded in a manner wherein each respective support assembly 61 that has been deployed supports a respective portion of the load associated with trailer 30.

Figure 25:
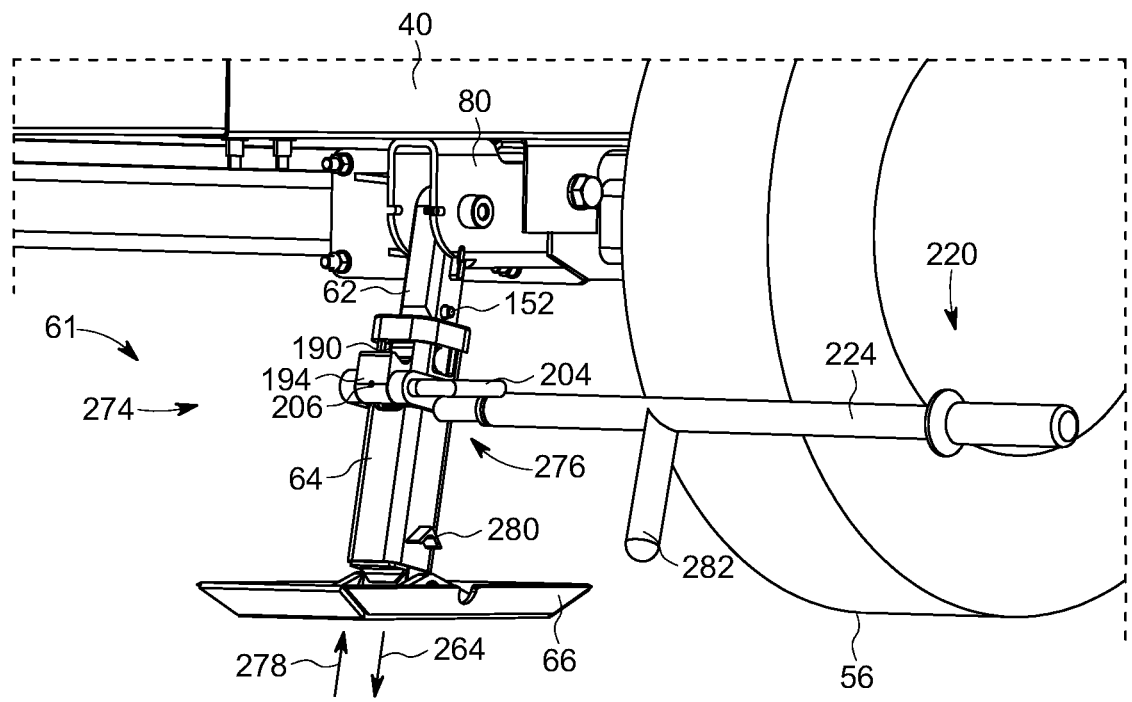
FIG. 25 is a view similar to FIG. 24 and shows the optional tool engaged with an opposite side of the handle relative to the orientation shown in FIG. 24.
Figure 26:
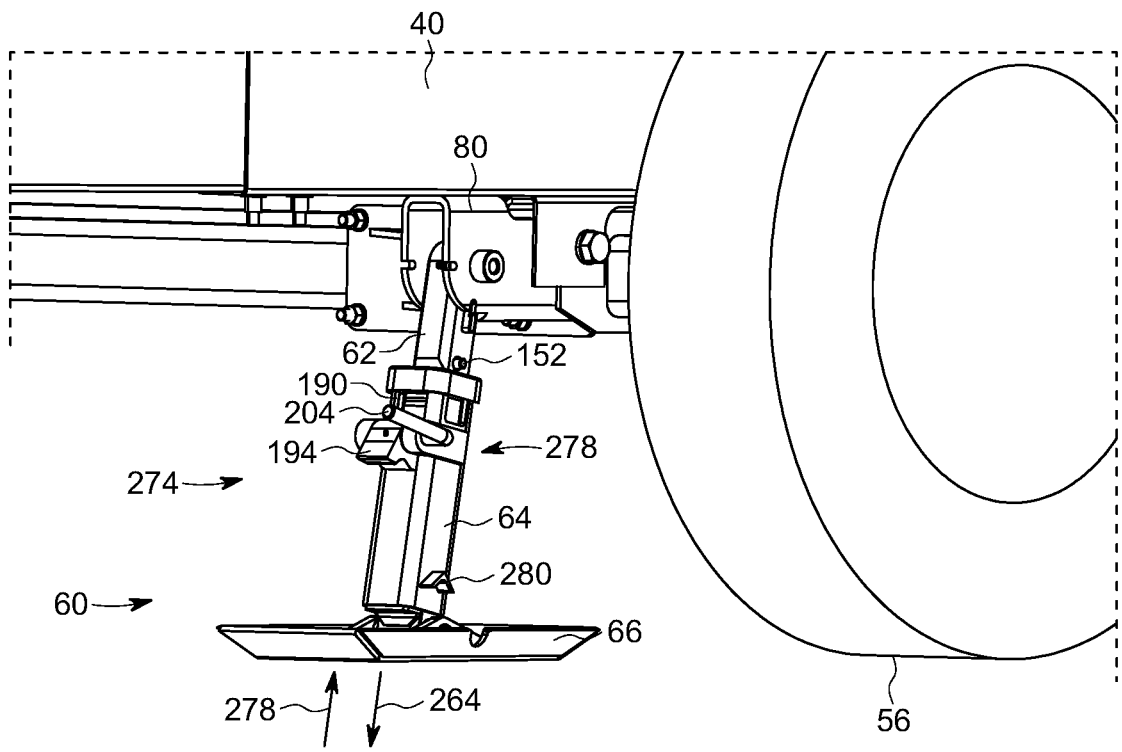
FIG. 26 is a view similar to FIG. 25 and shows the optional tool dissociated from the respective trailer leveling assembly and the handle, and a pawl associated therewith, rotated to a noninterfering association wherein the pawl disengages a rack associated with a respective post of the underlying respective trailer leveling assembly.
Figure 27:
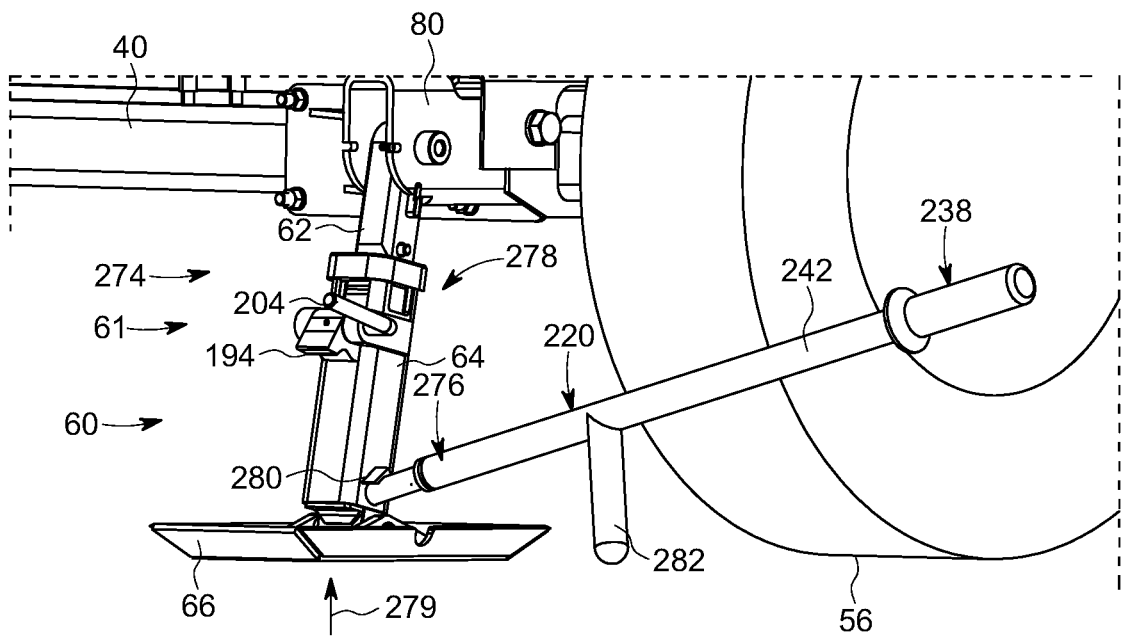
FIGS. 27 and 28 are perspective views of an alternate embodiment of the tool shown in FIG. 15 engaged with the trailer leveling assembly during a sequence associated with returning each discrete trailer leveling assembly toward a stowed position or orientation.
Figure 28:
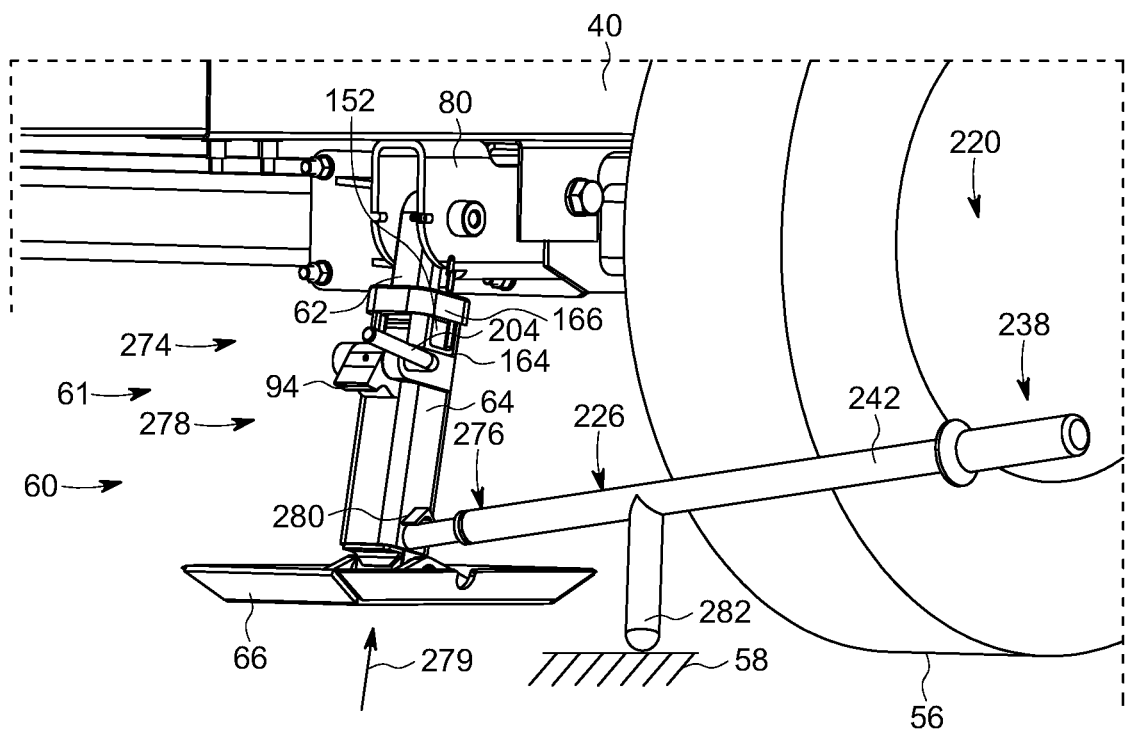

Referring to FIGS. 25 and 26, during deployment, pawl 194 preferably freely slideably cooperates with rack 190 defined by post 62 as tube 64 translates only in the downward axial direction 264. Preferably, handle 204 is connected to pawl 194 via roll pin 206 or the like such that rotation of handle 204 relative to an axis of rotation defined by the cooperation of pawl 194 with tube 64. Handle 204 and pawl 194 assembly 274 is movable relative to tube 64, and thereby post 62 and rack 190, between a rack engaging orientation or position 276, as shown in FIG. 25, and a rack disengaged position 278, as shown in FIG. 26. When disengaged, pawl 194 is oriented relative to tube 64 so as to not interfere with and/or otherwise interact with rack 190 defined by post 62 during telescopic slideable cooperation of post 62 and tube 64. More preferably, handle 204 is connected to pawl 194 so as to maintain the desired relative orientation of handle and pawl assembly 274 relative to tube 64 whether engaged with rack 190 in the first orientation 276 as shown in FIG. 25 or operatively disengaged therefrom as shown in disengaged orientation 278, shown in FIG. 26. Preferably, handle 204 provides an over center configuration relative to the axis of rotation of pawl 194 relative to tube 64 and relative to the angle or degree of the longitudinal axis defined by the telescopic cooperation between tube 64 and post 62 when support assembly 61 is oriented in the stowed orientation relative to saddle 80.

When oriented in the in-use or deployed orientation 276 as shown in FIG. 25, the cooperation of pawl 194 with rack 190 allows slidable telescopic cooperation between post 62 and tube 64 in a lengthening direction but prevents telescopic translation of tube 64 relative to post 62 in an axial compressive or shortening direction indicated by arrow 278. Said another way, the operative cooperation between pawl 194 and rack 190 and handle and pawl assembly 274 are oriented in the engaged or in-use orientation 276 prevents shortening of the longitudinal length of support assembly 61 in response to compressive forces in direction 278. When handle and pawl assembly 274 are oriented in the disengaged orientation 278 shown in FIG. 26, tube 64 is axially translatable relative to post 62 in either of directions 264, 278 relative thereto. Preferably, handle and pawl assembly 274 of each leveling assembly 60 intended to be deployed during a leveling event is oriented in the in-use orientation 276 associated with the discrete pawl 194 engaging rack 190.

Referring to FIGS. 1, 5, and 26, when it is desired to park and level trailer 30, one or more of leveling assemblies 60 is oriented in the deployed position or orientation and such that each respective pawl 194 is engaged with the respective rack 190 until the respective shoe 66 engages an underlying support surface 58. The cooperation of the discrete pawls 194 with the discrete respective teeth 192 and cavities 196 of the discrete racks 190 prevent compression of each of the discrete support assemblies 61. The engagement of the discrete catches 130 with the discrete stops 118, 126 associated with discrete saddles 80 prevent rotation of the discrete support assemblies 80 in a direction away from the deployed orientation.

When initially deployed, the discrete leveling assemblies will be oriented in a manner that does not initially manipulate the inclination or pitch of trailer assembly 30. Operation of jack 50 associated with tongue 48 of trailer 30, whether in an extension or retraction direction, effectuates a fore/aft "rocking" motion of trailer assembly 30 associated with supporting trailer assembly 30 and a respective fore/aft ones of leveling assemblies 60 oriented in the deployed position. Such operation intermittently "unloads" one or more of the fore/aft position leveling assemblies 60 such that the same, when unloaded, allow the respective tube 94 to slide in an elongation or extension direction relative to the corresponding post 62 and allow pawl 194 to engage rack 190 at teeth and cavity locations further from pivot pin 94. Subsequent operation of jack 50 in the opposing operational direction allows "loading" of the recently extended leveling assembly 60 and "unloading" of one or more of the previously "loaded" leveling assemblies. Continued operation of jack 50 allows advance of the pawl and rack association of one or more of the recently "unloaded" leveling assemblies. The process of extending and retracting jack 50 can be repeated until a desired degree of levelness of trailer assembly 30 is attained.

It should be appreciated that the methodology disclosed above is but one example of use of leveling assemblies 60. For instance, an extraneous jack assembly of lifting arrangement can be employed to allow the relative degree of extension of a desired number of leveling assemblies 60 associated with a respective trailer. It is further appreciated that one or more of wheels 56 can be employed to cooperate with one or more leveling assemblies 60 so as to manipulate the degree of levelness or tip or tilt of a trailer assembly. For instance, deploying the respective leveling assemblies 60 associated with the lower oriented side of a trailer assembly, and subsequent operation of jack 50 or use of a supplemental jack, can be employed to lengthen the leveling assemblies associated with one lateral side of trailer assembly to a tolerable degree within the elevational support provided by wheels 56 associated with the opposing lateral side of trailer assembly 30. It is further appreciated that, depending upon the degree of incline or tilt associated with placement of trailer assembly, blocking or the like can be associated with one or more of shoes 66 to provide a nearer degree of levelness that can be satisfied by the range of operation associated with the number and placement of the discrete leveling assemblies 60 associated with any given trailer assembly 30.

Referring to FIGS. 25-28, when it is desired to return each discrete leveling assembly 60 to the stored orientation relative to trailer assembly 30, tube 64 is retracted relative to post 62 to achieve the shortest longitudinal length associated therewith or to orient support assembly 61 in a longitudinally retracted position. Referring briefly to FIG. 1 and the disclosure provided above with respect to deployment of leveling assemblies 60, it should be appreciated that, during stowage of leveling assemblies 60 from a deployed level position of trailer assembly 30, extension of jack 50 associated with tongue 48 effectively unloads any deployed leveling assemblies oriented forward of a more rearward positioned deployed leveling assembly 60. In a similar manner, retraction of jack 50 associated with tongue 48 when a respective trailer assembly 30 is oriented in an acceptable level position and one or more leveling assemblies are deployed unloads any leveling assemblies 60 that have been deployed and are oriented rearward of other deployed leveling assemblies and/or relative to wheels 56. Once sufficiently unloaded, or if assisted with a lever, shovel or the like, the user can manually return each previously deployed trailer leveling assembly 60 from the deployed position or orientation to the stowed and retracted orientation relative to trailer assembly 30.

As shown in FIGS. 25 and 26, each leveling assembly 60 includes a flange 280 that extends in an outward lateral direction relative to tube 64 and relative to the underlying trailer assembly. Flange 280 is constructed to cooperate with distal end 276 of tool assembly 220. Tool assembly 220 includes an optional handle portion 282 that extends in a crossing direction relative to the longitudinal length of tool assembly 220. With handle and pawl assembly 274 oriented in the disengaged position 278 relative to tube 64, and thereby pawl 194 disengaged from rack 190 defined by post 62, tube 64 is rendered axially translatable relative to post 62 in the longitudinally shortening or commonly directed load compression direction 278.

To simplify compression associated with each support assembly 61, distal end 276 of tool assembly 220 cooperates with flange 280 defined by tube 64 such that a user positioned laterally outboard proximate discrete wheels 56 or discrete leveling assemblies 60 can collapse each respective support assembly 61 with which tool assembly 220 is engaged to an orientation wherein catch 152 engages cut out 164 thereby restraining slideable translation of tube 64 relative to post 62. Supplemental handle portion 282 is oriented to provide a fulcrum relative to user interaction with grip 238 and underlying ground or support surface 58 and to effectuate elevation of end 276 and thereby tube 64. That is, it should be appreciated that downward translation of grip 238 while supplemental handle 282 is supported or otherwise engage with ground surface 290 effectuate upward translation of distal end 276 and thereby tube 64 relative to the underlying post 62 when handle and pawl assembly 274 are oriented in the disengaged orientation 274 relative thereto.

During upward translation of tube 64 relative to post 62, or translation of tube 64 toward saddle 80, contour 170 (FIG. 6) associated with the post facing surface of distal end 166 of tube 64 urges catch 152 in an inboard lateral direction relative to post 62. Upon sufficient translation, biasing device 156 urges the distal end 158 of catch 152 into the area defined by cavity 164 of tube 64 and thereby restricts downward longitudinal translation of tube 64 relative to post 62 without subsequent user interaction or interference with the cooperation of catch 152 with tube 64. Once retracted or otherwise oriented in the longitudinally compressed configuration, subsequent user interaction and/or association of tool assembly 220 with pivot pin 94 in the reverse operational sequence described above with respect to FIGS. 17-22 directed to deployment of support assemblies 61, allows post 234 of tool assembly 222 to engage and translate catch 130 relative to post 62 such that posts 230, 232 associated with tool assembly 220 and supplemental handle or grip site 240 can be used to effectuate the upward rotational translation indicated by arrow 298 (FIGS. 18, 21) until catch 130 is subsequently aligned with stops 116, 224 such that disengagement of post 234 from catch 130 allows support assembly 61 to be reoriented and secured in the stowed orientation 65 when use or transport of trailer assembly 30 is desired.

Leveling assemblies 60 provide a convenient and robust trailer leveling assembly that can be deployed from locations outside the vertical plan footprint of an underlying trailer assembly. The inclination and tilt of trailers equipped with one or more trailer leveling assemblies 60 can be quickly, conveniently, and incrementally adjusted to achieve a desired or tolerable degree of levelness when deployed on topographies whose degree of levelness or grade is commonly beyond the control of users to manipulate. The modularity of leveling assemblies 60 further allows leveling assemblies 60 to be associated with a wide variety of trailer configurations and types.

Therefore, one embodiment of the present invention includes a trailer leveling system having a post that is constructed to be pivotably connected to a structural member of a trailer. A rack is formed along at least a portion of post and a tube slideably cooperates with the post. A pawl is pivotably connected to the tube and is oriented to cooperate with the rack to selectively prohibit longitudinal translation of the tube in an overlapping direction relative to the post when the pawl is engaged with the rack.

Another embodiment of the present invention that includes features and/or aspects combinable or usable with one or more of the above embodiments includes a trailer support system having a support assembly that is defined by a tube and a post that slideably cooperate with one another to manipulate a longitudinal length of the support assembly. A rack is formed by a respective one of the tube and the post and a pawl is supported by the other of the tube and the post. The rack is formed in a surface of the respective one of the tube and post that faces the other of the tube and the post. The pawl is pivotably connected to the other of the tube and the post and oriented to interact with the rack to selectively prevent reducing a length of the support assembly and allow the tube and the post to telescopically cooperate with one another when the length of the support assembly is increased.

A further embodiment of the present invention that includes one or more features and/or aspects that are combinable with one or more of the above embodiments includes a method for forming a trailer leveling assembly. The method includes providing a support assembly that is defined by a first member and a second member that slideably cooperate with one another. A rack is defined by one of the first member and the second member and extends along at least a portion thereof. A pawl is pivotably supported by the other of the first member and the second member such that the pawl selectively engages the rack to prevent bypass translation of the first member and the second member in a direction that decreases a length of the support assembly and allows bypass translation of the first member and the second member in a direction that increases the length of the support assembly. A mount is provided and is constructed to be secured to a structural member of a trailer and pivotably support at least one support assembly. A plurality of catches are provided to maintain more than one rotational position of the support assembly relative to the saddle.

The present invention has been described in terms of the preferred embodiment, the embodiment disclosed herein is directed to the assembly as generally shown in the drawings. It is recognized that equivalents, alternatives, and modifications, aside from those expressly stated, to the embodiments summarized, or the embodiment shown in the drawings, are possible and within the scope of the appending claims. The appending claims cover all such alternatives and equivalents.

I claim:

1. A trailer leveling system comprising:
    a post constructed to be pivotably connected to a support structure of a trailer;
    a rack formed along at least a portion of post;
    a tube constructed to slideably cooperate with the post;
    a pawl pivotably connected to the tube and oriented to cooperate with the rack to selectively prohibit longitudinal translation of the tube in an overlapping direction relative to the post when the pawl is engaged with the rack;
    a saddle connected to the support structure and disposed between the support structure and the post;
    a catch supported by the post and constructed to selectively interfere with rotation of the post relative to the saddle; and
    a first stop and a second stop defined by the saddle and oriented to cooperate with the catch to define a stowed orientation of the post and a deployed orientation of the post relative to the support structure.

2. The trailer leveling system of claim 1 further comprising a shoe pivotably connected to the tube at a location opposite the post.

3. The trailer leveling system of claim 1 further comprising a hand tool constructed to cooperate with at least one of the post and the tube and cooperate with the catch to disengage the catch from a respective one of the first stop and the second stop and facilitate rotation of the post and the tube relative to the support structure.

4. The trailer leveling system of claim 1 further comprising a plurality of trailer leveling systems that are each independently pivotably connected to the support structure.

5. A trailer support system comprising:
a support assembly defined by a tube and a post that slideably cooperate with one another to manipulate a longitudinal length of the support assembly;
a rack formed by a respective one of the tube and the post and a pawl supported by the other of the tube and the post;
the rack being formed in a surface of the respective one of the tube and post that faces the other of the tube and the post;
the pawl pivotably connected to the other of the tube and the post and oriented to interact with the rack to selectively prevent reducing a length of the support assembly and allow the tube and the post to telescopically cooperate with one another when the length of the support assembly is increased; and
a catch supported by the post and configured to selectively overlap a travel path of the tube relative to the post to interfere with lengthening of the support assembly when the support assembly is oriented at a respective shortest available length.

6. The trailer support system of claim 5 wherein the rack is further defined by a plurality of teeth formed on the post.

7. The trailer support system of claim 5 further comprising a saddle constructed to be secured to a rigid structure of a trailer and secure the support assembly relative thereto.

8. The trailer support system of claim 5 further comprising another catch supported by the post and configured to selectively interfere with rotation of the support assembly relative to a saddle disposed between the support assembly and a rigid structure of a trailer.

9. The trailer support system of claim 8 further comprising a first detent and a second detent defined by the saddle, each detent formed to selectively cooperate with the another catch when the support assembly is oriented at a stowed position and a deployed position, respectively, relative to the saddle.

10. The trailer support system of claim 9 further comprising a tool constructed to extend beyond a wheel of a trailer and engage a respective one of the catch and another catch to facilitate rotation of the support assembly relative to the saddle and telescopic operation of the tube and the post.

11. The trailer support system of claim 5 further comprising a shoe attached to a free end of one of the tube and the post and configured to engage a support surface when the support assembly is deployed.

12. A method for forming a trailer leveling assembly, the method comprising:
providing a support assembly that is defined by a first member and a second member that slideably cooperate with one another;
defining a rack that extends along at least a portion of one of the first member and the second member;
providing a pawl that is pivotably supported by the other of the first member and the second member and selectively engages the rack to prevent bypass translation of the first member and the second member in a direction that decreases a length of the support assembly and allows bypass translation of the first member and the second member in a direction that increases the length of the support assembly;
providing a mount constructed to be secured to a structural member of a trailer and pivotably support at least one support assembly; and
defining a plurality of catches to maintain a relative rotational position of the support assembly relative to the mount and slideably supporting the plurality of catches relative to one of the first member and the second member so that each of the plurality of catches is slideable in a lateral direction that is aligned with an axis of rotation of the support assembly relative to the mount and biased in an opposite lateral direction to interfere with rotation of the support assembly relative to the mount.

13. The method of claim 12 further comprising providing a shoe pivotably connected to a free end of the support assembly.

14. The method of claim 12 further comprising providing a tool that is configured to manipulate each of the plurality of catches and facilitate rotation of the support assembly.

15. The method of claim 12 further comprising providing a plurality of support assemblies.

16. The method of claim 15 further comprising securing the plurality of support assemblies to a trailer at multiple discrete locations.

* * * * *